(12) United States Patent
Izumi et al.

(10) Patent No.: US 10,359,867 B2
(45) Date of Patent: Jul. 23, 2019

(54) INFORMATION PROCESSING APPARATUS AND INFORMATION PROCESSING METHOD

(71) Applicant: SONY CORPORATION, Tokyo (JP)

(72) Inventors: Akihiko Izumi, Kanagawa (JP); Naoyuki Sato, Tokyo (JP); Kuniaki Torii, Kanagawa (JP); Katsuya Hyodo, Kanagawa (JP); Hikotatsu Chin, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/529,221

(22) PCT Filed: Oct. 27, 2015

(86) PCT No.: PCT/JP2015/080291
§ 371 (c)(1),
(2) Date: May 24, 2017

(87) PCT Pub. No.: WO2016/088477
PCT Pub. Date: Jun. 9, 2016

(65) Prior Publication Data
US 2017/0329417 A1 Nov. 16, 2017

(30) Foreign Application Priority Data
Dec. 2, 2014 (JP) .................. 2014-243783

(51) Int. Cl.
*G06F 3/038* (2013.01)
*G06F 3/044* (2006.01)
(Continued)

(52) U.S. Cl.
CPC .............. *G06F 3/038* (2013.01); *G06F 3/011* (2013.01); *G06F 3/012* (2013.01); *G06F 3/0304* (2013.01);
(Continued)

(58) Field of Classification Search
CPC ...... G06F 3/041; G06F 3/04883; G06F 3/044; G06F 3/0415; G06F 3/0444; G06F 3/048
See application file for complete search history.

(56) References Cited

U.S. PATENT DOCUMENTS

2007/0234222 A1 10/2007 Yamaguchi et al.
2009/0176476 A1* 7/2009 Foladare ........... H04M 3/42374
455/404.2
(Continued)

FOREIGN PATENT DOCUMENTS

EP 2300901 A2 3/2011
JP 2004-318207 A 11/2004
(Continued)

OTHER PUBLICATIONS

International Search Report and Written Opinion of PCT Application No. PCT/JP2015/080291, dated Jan. 12, 2016, 02 pages of English Translation and 07 pages of ISRWO.

*Primary Examiner* — Md Saiful A Siddiqui
(74) *Attorney, Agent, or Firm* — Chip Law Group

(57) ABSTRACT

Information processing apparatus and method to provide a technology for enabling UI disposition in a plurality of cooperation apparatuses to be controlled in consideration of a plurality of users. The disclosed information processing apparatus includes a disposition control unit configured to control UI disposition in a plurality of cooperation apparatuses performing a cooperation operation among a plurality of apparatuses on the basis of at least one of attributes of a plurality of users and a positional relation between the plurality of users and the plurality of apparatuses.

16 Claims, 26 Drawing Sheets

(51) Int. Cl.
*G06F 13/00* (2006.01)
*G06F 9/451* (2018.01)
*G06F 3/14* (2006.01)
*G06F 3/01* (2006.01)
*G06F 3/03* (2006.01)

(52) U.S. Cl.
CPC .......... *G06F 3/1438* (2013.01); *G06F 3/1454* (2013.01); *G06F 9/451* (2018.02); *G06F 13/00* (2013.01)

(56) References Cited

U.S. PATENT DOCUMENTS

| | | | |
|---|---|---|---|
| 2010/0017372 A1 | 1/2010 | Park et al. | |
| 2012/0011451 A1* | 1/2012 | Bansal | H04N 7/15 715/753 |
| 2012/0215849 A1* | 8/2012 | Shekhawat | G06Q 10/10 709/204 |
| 2014/0240440 A1* | 8/2014 | Seo | H04L 51/04 348/14.03 |
| 2014/0287799 A1* | 9/2014 | Choi | G06F 3/0482 455/566 |
| 2015/0026261 A1* | 1/2015 | Shimakawa | G06Q 10/10 709/204 |
| 2016/0057537 A1* | 2/2016 | Robinson | H04R 5/04 381/77 |
| 2016/0373531 A1* | 12/2016 | Yin | H04L 12/1822 |

FOREIGN PATENT DOCUMENTS

| | | |
|---|---|---|
| JP | 2007-265236 A | 10/2007 |
| JP | 2008-099313 A | 4/2008 |
| JP | 2009-205543 A | 9/2009 |
| JP | 2011-528146 A | 11/2011 |
| JP | 2013-258483 A | 12/2013 |
| JP | 2014-011477 A | 1/2014 |
| WO | 2009/107666 A1 | 9/2009 |
| WO | 2010/008230 A2 | 1/2010 |
| WO | WO 2013/145518 * | 10/2013 |

\* cited by examiner

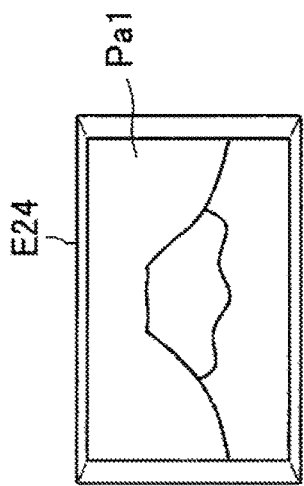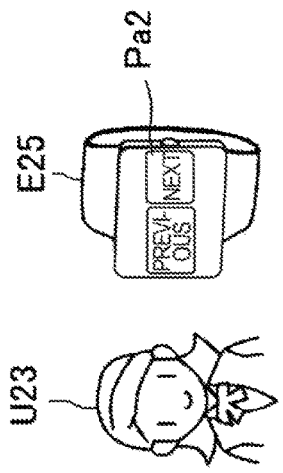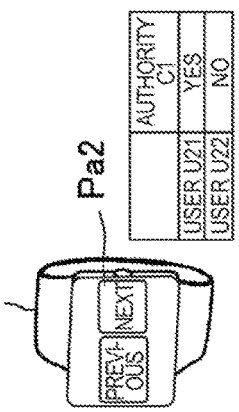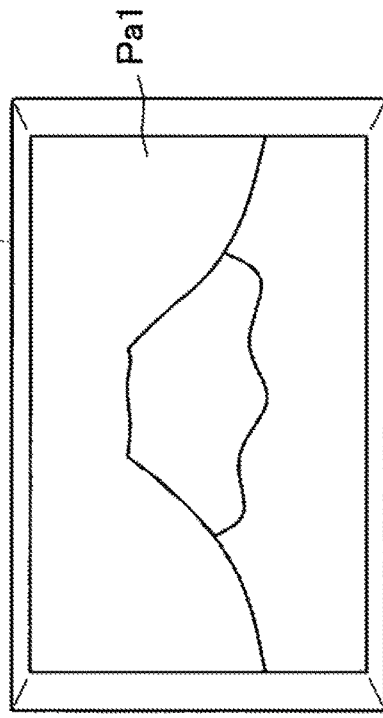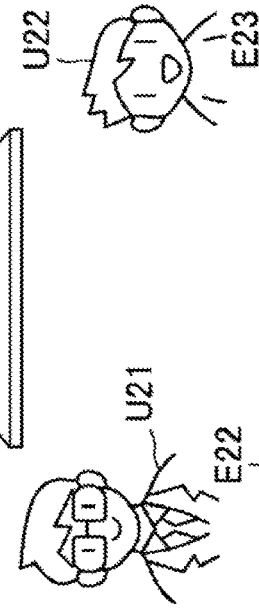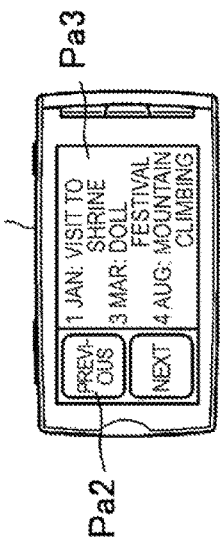
FIG. 5

FIG. 6

| | APPARATUS TYPE | DUPLICATION POLICY | TARGET USER GROUP |
|---|---|---|---|
| PHOTO DISPLAY | tv, table, phone | mirror | ALL USERS |
| BASIC MANIPULATION | phone, watch, tablet | multi | ALL USERS |
| EXTENSION MANIPULATION | phone, watch, tablet | multi | USER WITH AUTHORITY C1 |

FIG. 7

```
<!--APPARATUS TYPE:tv, tablet, phone DUPLICATION POLICY: mirror TARGET USER GROUP: ALL USERS-->
<image data-dev-type="tv, table, phone" data-duplicate="mirror" data-user-group="all"></image>

<!--APPARATUS TYPE:tv, tablet, phone DUPLICATION POLICY: mirror TARGET USER GROUP: ALL USERS-->
<x-basic-ctrl data-dev-type="phone, watch, tablet" data-duplicate="multi" data-user-group="all"></x-basic-ctrl>

<!--APPARATUS TYPE:tv, tablet, phone DUPLICATION POLICY: mirror TARGET USER GROUP: USER WITH AUTHORITY C1-->
<x-ext-ctrl data-dev-type="phone, watch, tablet" data-duplicate="multi" data-user-group="gp1"></x-ext-ctrl>
```

FIG. 9

| | APPARATUS TYPE | DUPLICATION POLICY | TARGET USER GROUP |
|---|---|---|---|
| PHOTO DISPLAY | tv, tablet, phone | mirror | ALL USERS |
| BASIC MANIPULATION | phone, watch, tablet | multi | USER WITH AUTHORITY C2 |
| EXTENSION MANIPULATION | phone, watch, tablet | multi | USER WITH AUTHORITY C1 |

FIG. 10

|  | UI COMPONENT [1] | UI COMPONENT [2] | UI COMPONENT [3] | ... |
|---|---|---|---|---|
| APPARATUS [1] | 1 |  | 1 |  |
| APPARATUS [2] | 1 | 1 |  |  |
| APPARATUS [3] | 1 |  |  |  |
| ... |  |  |  |  |

"1" REPRESENTS THAT UI COMPONENT IS DISPOSED IN APPARATUS

IN THIS EXAMPLE, FOLLOWING DISPOSITION IS EXPRESSED
- UI COMPONENT [1] IS DISPOSED IN ALL APPARATUSES [1] TO [3]
- UI COMPONENT [2] IS DISPOSED IN APPARATUS [2]
- UI COMPONENT [3] IS DISPOSED IN APPARATUS [1]

FIG. 11

|  | UI COMPONENT [X] |
|---|---|
| APPARATUS [1] |  |
| APPARATUS [2] |  |
| APPARATUS [3] | 1 |
| ... |  |

MATRIX IN WHICH ONLY COLUMN CORRESPONDING TO SPECIFIC COMPONENT IS SELECTED FROM DISPOSITION MATRIX

IN THIS EXAMPLE, FOLLOWING DISPOSITION IS EXPRESSED
- UI COMPONENT [X] IS DISPOSED IN APPARATUS [3]

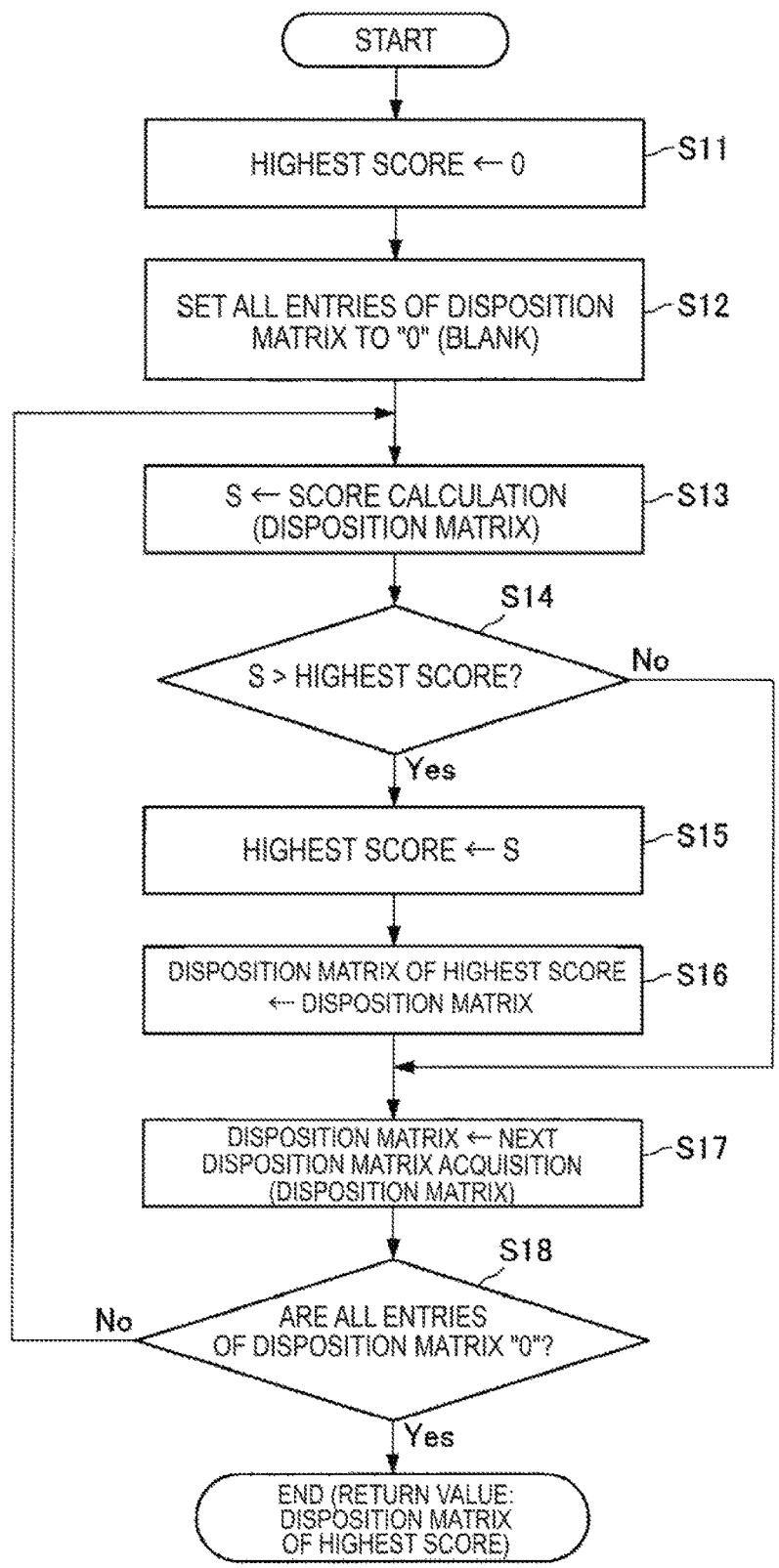

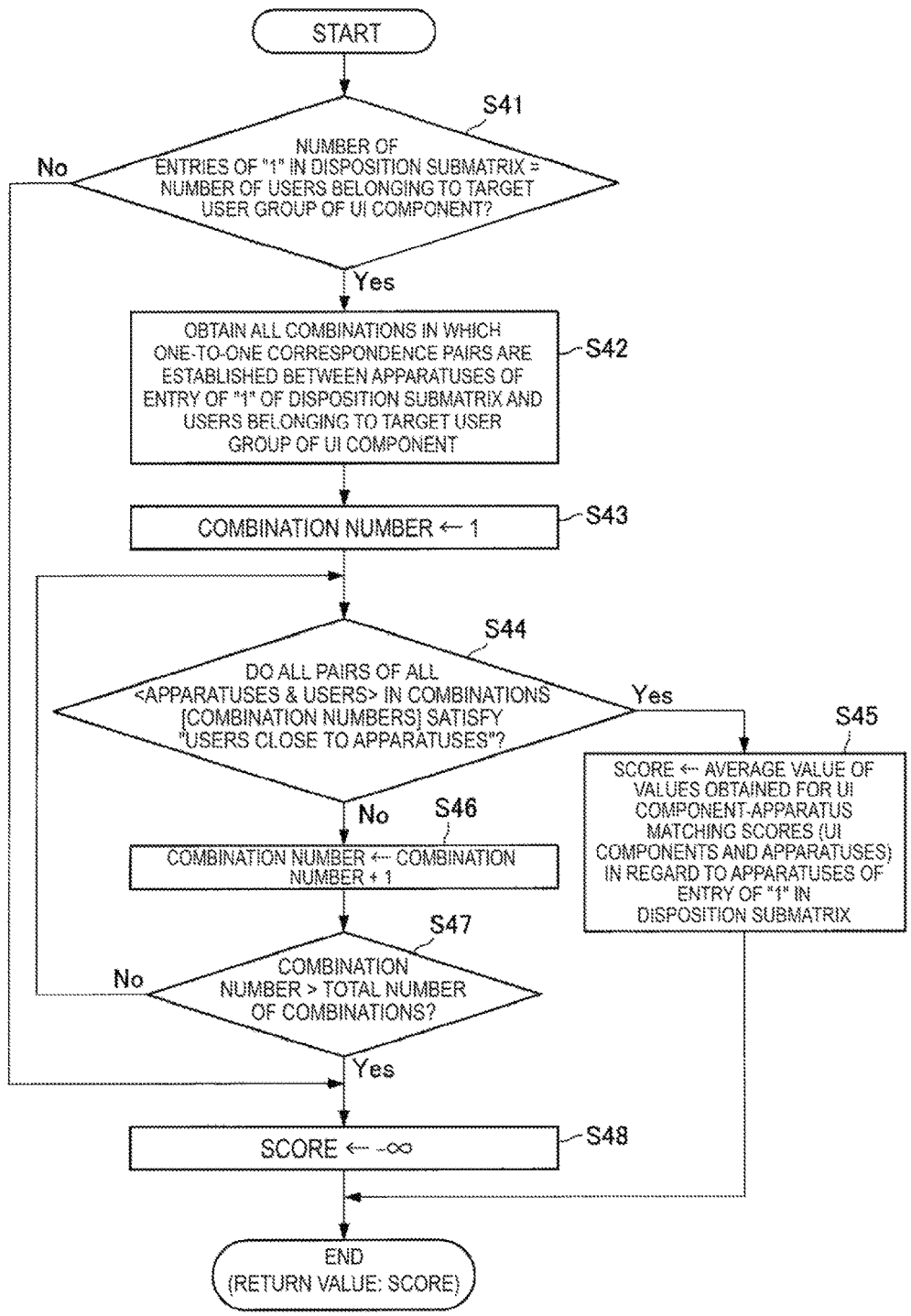

FIG. 16

USERS BELONGING TO USER GROUP DESIGNATED WITH
annotation OF UI COMPONENT[X] = {USER 1, USER 3, USER 5}

| UI COMPONENT [X] |
|---|
| APPARATUS [1] |  |
| APPARATUS [2] | 1 |
| APPARATUS [3] | 1 |
| APPARATUS [4] | 1 |

| | PAIR OF APPARATUS AND USER |
|---|---|
| COMBINATION [1] | (APPARATUS [2], USER 1), (APPARATUS [3], USER 3), (APPARATUS [4], USER 5) |
| COMBINATION [2] | (APPARATUS [2], USER 1), (APPARATUS [3], USER 5), (APPARATUS [4], USER 3) |
| COMBINATION [3] | (APPARATUS [2], USER 3), (APPARATUS [3], USER 1), (APPARATUS [4], USER 5) |
| COMBINATION [4] | (APPARATUS [2], USER 3), (APPARATUS [3], USER 5), (APPARATUS [4], USER 1) |
| COMBINATION [5] | (APPARATUS [2], USER 5), (APPARATUS [3], USER 1), (APPARATUS [4], USER 3) |
| COMBINATION [6] | (APPARATUS [2], USER 5), (APPARATUS [3], USER 3), (APPARATUS [4], USER 1) |

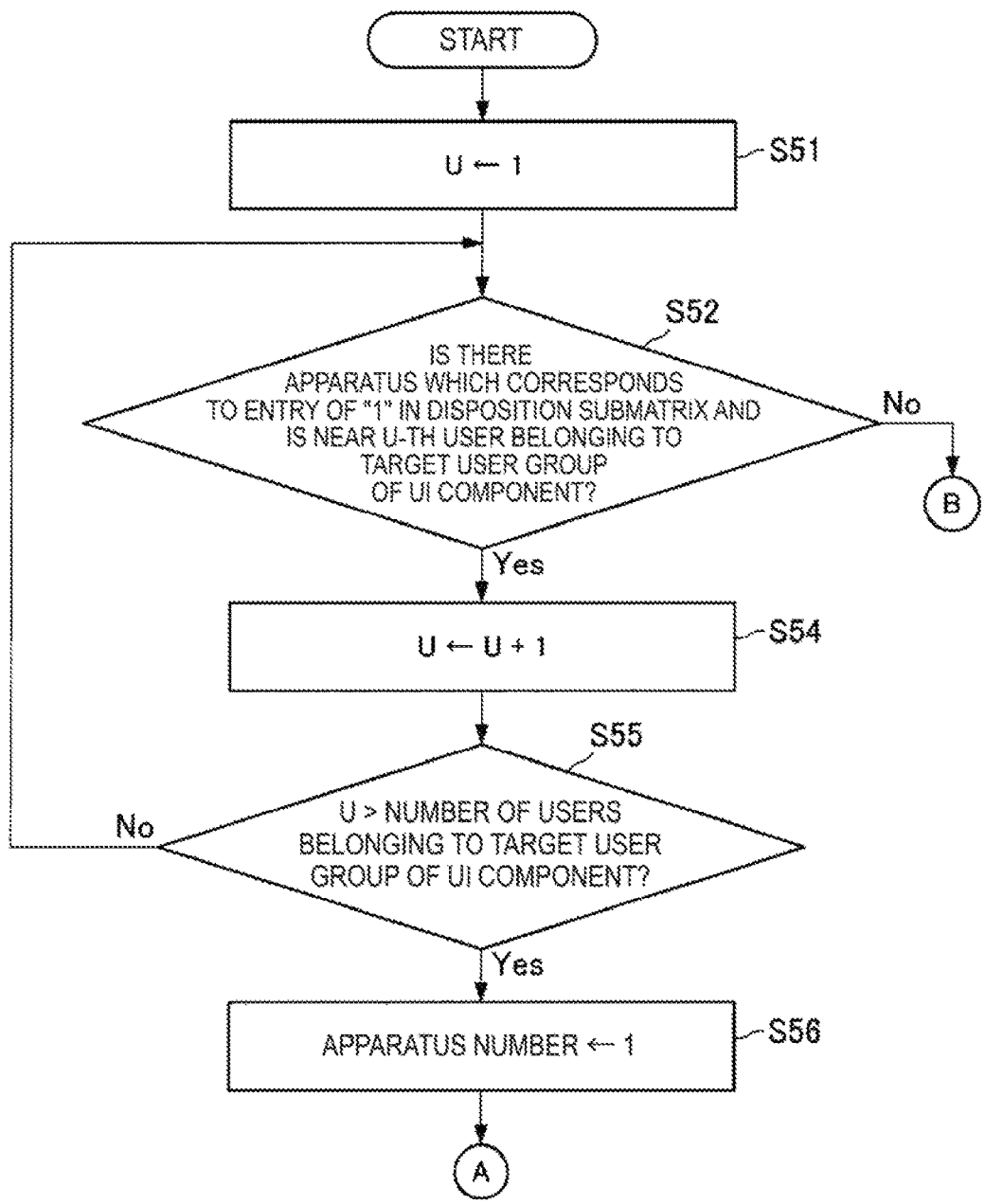

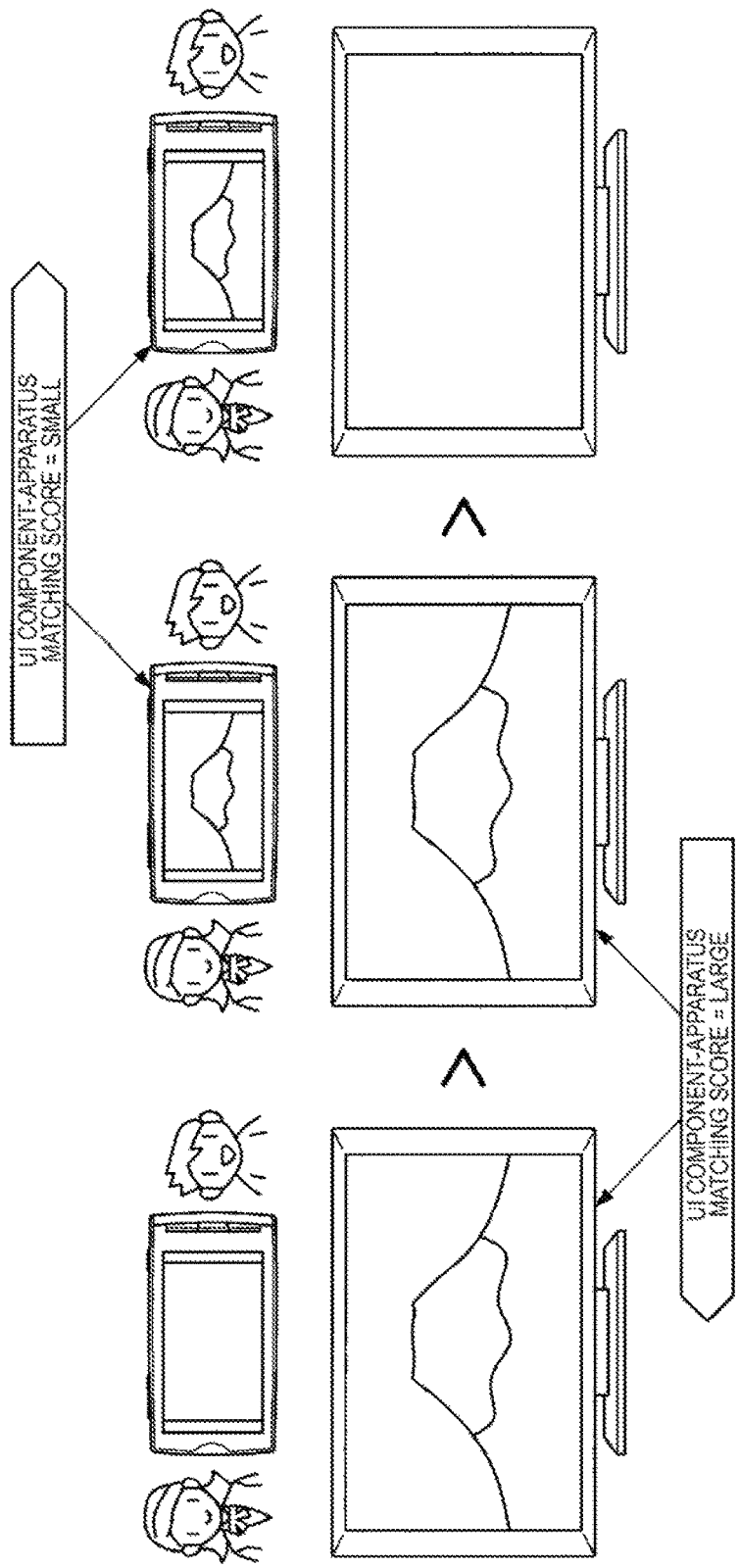

FIG. 21

| UI COMPONENT | APPARATUS TYPE | DUPLICATION POLICY | TARGET USER GROUP |
|---|---|---|---|
| PHOTO DISPLAY | tv, tablet, phone | mirror | all |
| BASIC MANIPULATION | phone, watch, tablet | multi | all |
| EXTENSION MANIPULATION | phone, watch, table | multi | gp1 |

FIG. 22

| UI COMPONENT | APPARATUS TYPE | DUPLICATION POLICY | TARGET USER GROUP |
|---|---|---|---|
| PARTNER VIDEO + VOICE | tv, tablet, phone | mirror | all |
| CAMERA | phone, tablet | single | |
| MICROPHONE | phone, watch | single | gp1 |
| MANIPULATION | tv, tablet, phone, watch | multi | all |

FIG. 23

| UI COMPONENT | APPARATUS TYPE | DUPLICATION POLICY | TARGET USER GROUP |
|---|---|---|---|
| PRESENT PAGE DISPLAY | tv, tablet, phone | mirror | all |
| MANIPULATION | phone, tablet | multi | gp1 |

FIG. 24

| UI COMPONENT | APPARATUS TYPE | DUPLICATION POLICY | TARGET USER GROUP |
|---|---|---|---|
| CANVAS | tv, tablet, phone | mirror | all |
| PEN POINT SELECTION | phone, tablet | multi | gp1 |

FIG. 25

| UI COMPONENT | APPARATUS TYPE | DUPLICATION POLICY | TARGET USER GROUP |
|---|---|---|---|
| CAMERA | tv, tablet, phone | mirror | all |
| ZOOM & SHUTTER | phone, tablet | multi | gp1 |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/080291 filed on Oct. 27, 2015, which claims priority benefit of Japanese Patent Application No. JP 2014-243783 filed in the Japan Patent Office on Dec. 2, 2014. Each of the above-referenced applications is hereby incorporated herein by reference in its entirety.

TECHNICAL FIELD

The present invention relates to an information processing apparatus, an information processing method, and a program.

BACKGROUND ART

In recent years, there have been systems in which a plurality of cooperation apparatuses operate in cooperation. In the systems, a user interface (UI) component for a cooperation operation is disposed in each of the plurality of cooperation apparatuses, and each cooperation apparatus displays the UI component disposed in the own cooperation apparatus. Here, a technology for deciding a UI component to be disposed in each of a plurality of apparatuses on the basis of a positional relation between the plurality of apparatuses and performance of the plurality of apparatuses is disclosed (for example, see Non-Patent Literature 1).

CITATION LIST

Non-Patent Literature

Non-Patent Literature 1: "Panelrama: Enabling Easy Specification of Cross-Device Web Applications," by Jishuo Yang and Daniel Wigdor, CHI 2014, One of a CHInd, Toronto, ON, Canada

DISCLOSURE OF INVENTION

Technical Problem

However, it is desirable to provide a technology for enabling UI disposition in a plurality of cooperation apparatuses to be controlled in consideration of a plurality of users.

Solution to Problem

According to the present disclosure, there is provided an information processing apparatus including: a disposition control unit configured to control UI disposition in a plurality of cooperation apparatuses performing a cooperation operation among a plurality of apparatuses on the basis of at least one of attributes of a plurality of users and a positional relation between the plurality of users and the plurality of apparatuses.

According to the present disclosure, there is provided an information processing method including: controlling UI disposition in a plurality of cooperation apparatuses performing a cooperation operation among a plurality of apparatuses on the basis of at least one of attributes of a plurality of users and a positional relation between the plurality of users and the plurality of apparatuses.

According to the present disclosure, there is provided a program for causing a computer to function as: an information processing apparatus including a disposition control unit configured to control UI disposition in a plurality of cooperation apparatuses performing a cooperation operation among a plurality of apparatuses on the basis of at least one of attributes of a plurality of users and a positional relation between the plurality of users and the plurality of apparatuses.

Advantageous Effects of Invention

According to the present disclosure, as described above, it is possible to control UI disposition in the plurality of cooperation apparatuses in consideration of a plurality of users. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram for describing another example of "the application for browsing content such as photos" corresponding to the apparatus cooperation according to the embodiment of the present disclosure.

FIG. 6 is a diagram illustrating an example of annotation in "the application for browsing content such as photos."

FIG. 7 is a diagram illustrating an example in which the annotation illustrated in FIG. 6 is described by a program code in an HTML tag format.

FIG. 9 is a diagram illustrating another example of the annotation.

FIG. 10 is a diagram illustrating a matrix representing disposition of UI components in apparatuses.

FIG. 11 is a diagram illustrating a matrix in which only a column of one UI component is selected from the disposition matrix illustrated in FIG. 10.

FIG. 12 is a diagram illustrating the flow of a process of deciding apparatuses to which each UI component is allocated.

Figure 13:
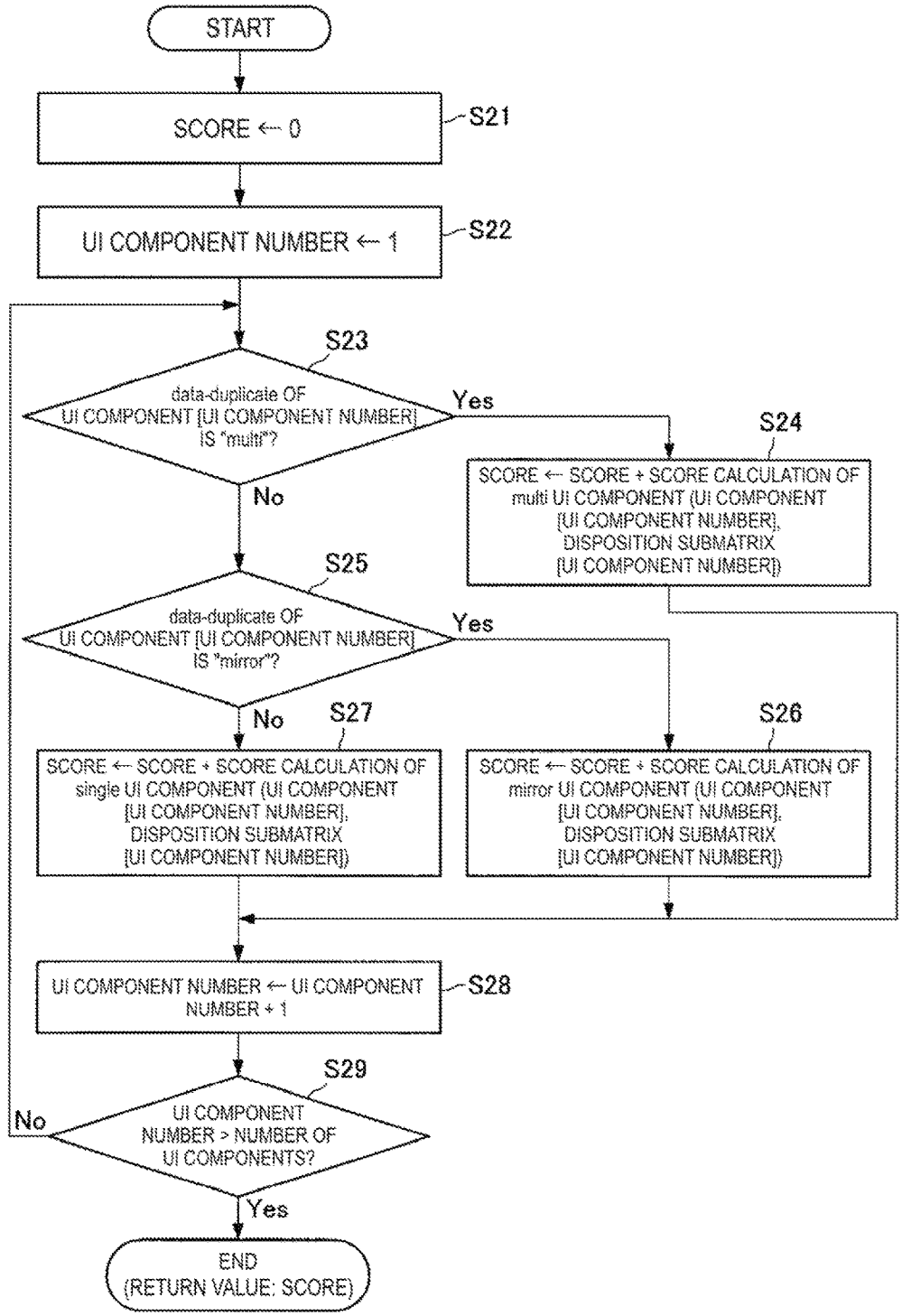
FIG. 13 is a diagram illustrating the flow of a process for "score calculation (disposition matrix) invoked from the process illustrated in FIG. 12.

and disposition submatrix [UI component number] of single UI component) invoked from the process illustrated in FIG. 13.

FIG. 15 is a diagram illustrating the flow of a process for "score calculation (UI component [UI component number] and disposition submatrix [UI component number] of multi UI component) invoked from the process illustrated in FIG. 13.

FIG. 16 is a diagram illustrating a generation example of a pair of apparatus and user.

FIG. 17 is a diagram illustrating the flow of a process for "score calculation (UI component [UI component number] and a disposition submatrix [UI component number] of mirror UI component)" invoked from the process illustrated in FIG. 13.

Figure 18:
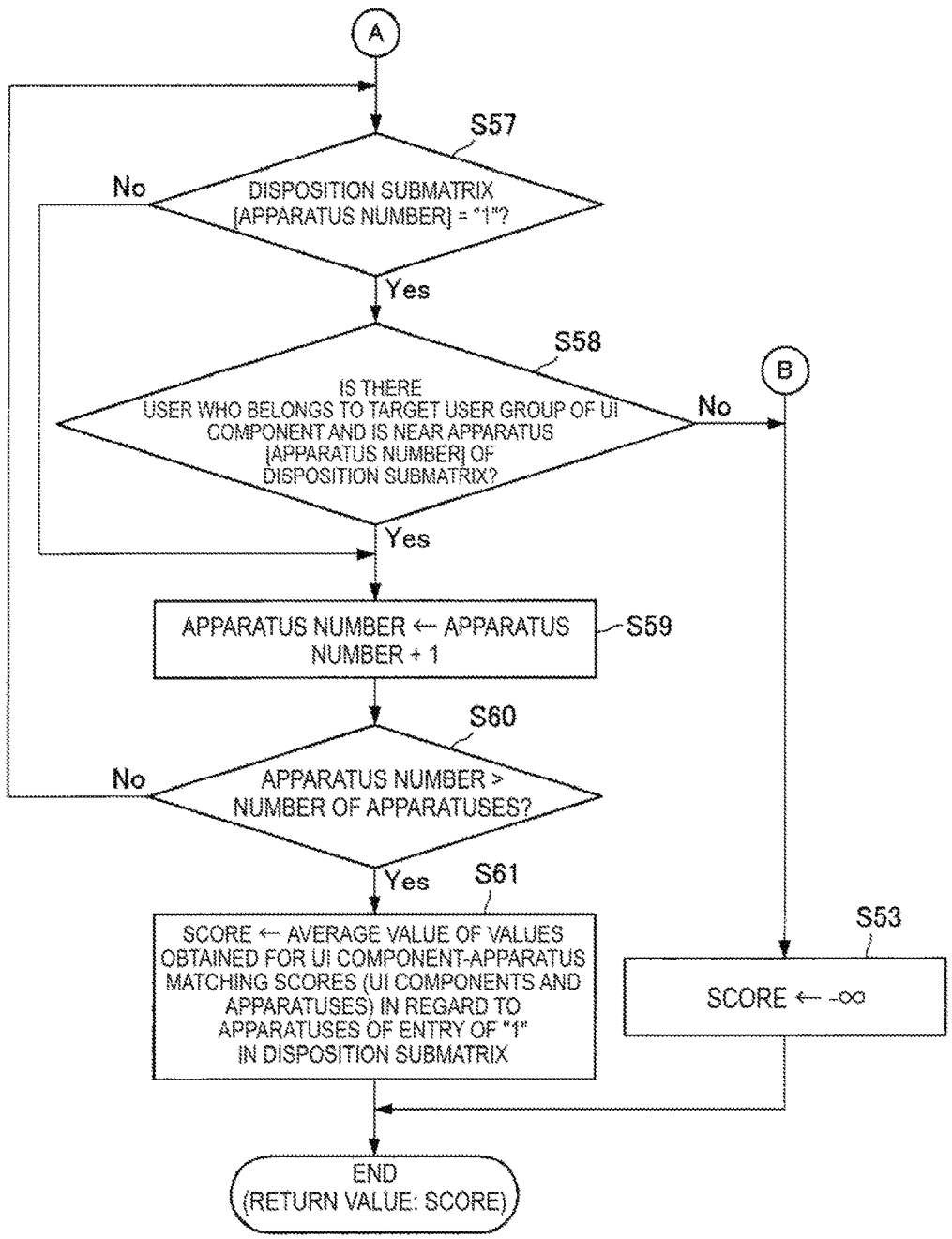

FIG. 18 is a diagram illustrating the flow of the process for "score calculation (UI component [UI component number] and a disposition submatrix [UI component number] of mirror UI component)" invoked from the process illustrated in FIG. 13.

FIG. 19 is a diagram illustrating a comparative example of average scores.

Figure 20A:
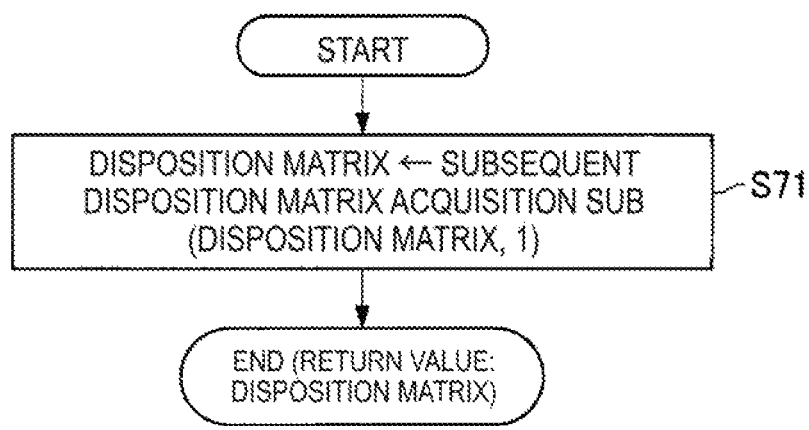

FIG. 20A is a diagram illustrating the flow of a process of obtaining "subsequent disposition matrix acquisition (disposition matrix)" invoked from FIG. 12.

Figure 20B:
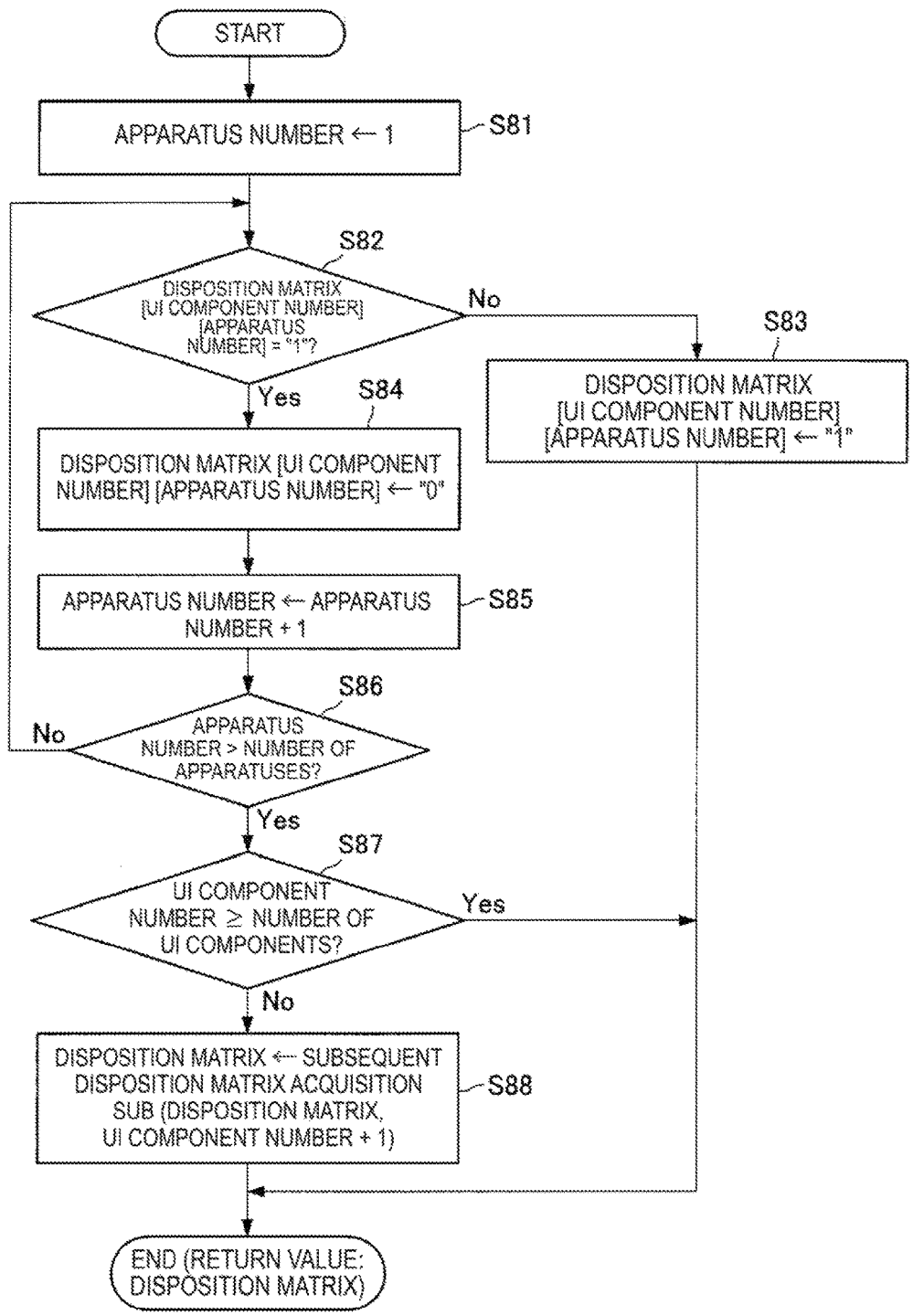

FIG. 20B is a diagram illustrating the flow of a process of obtaining "subsequent disposition matrix acquisition sub (disposition matrix, UI component number) invoked from FIG. 20A.

FIG. 21 is a diagram illustrating a designation example of annotation in "an application for browsing content such as photos."

FIG. 22 is a diagram illustrating a designation example of annotation in "an application for a TV telephone."

FIG. 23 is a diagram illustrating a designation example of annotation in "an application for reading a picture book or a picture-story show aloud."

FIG. 24 is a diagram illustrating a designation example of annotation in "an application for producing and editing a picture or the like jointly."

FIG. 25 is a diagram illustrating a designation example of annotation in "an application for taking photographs (remote photographing)."

Figure 26:
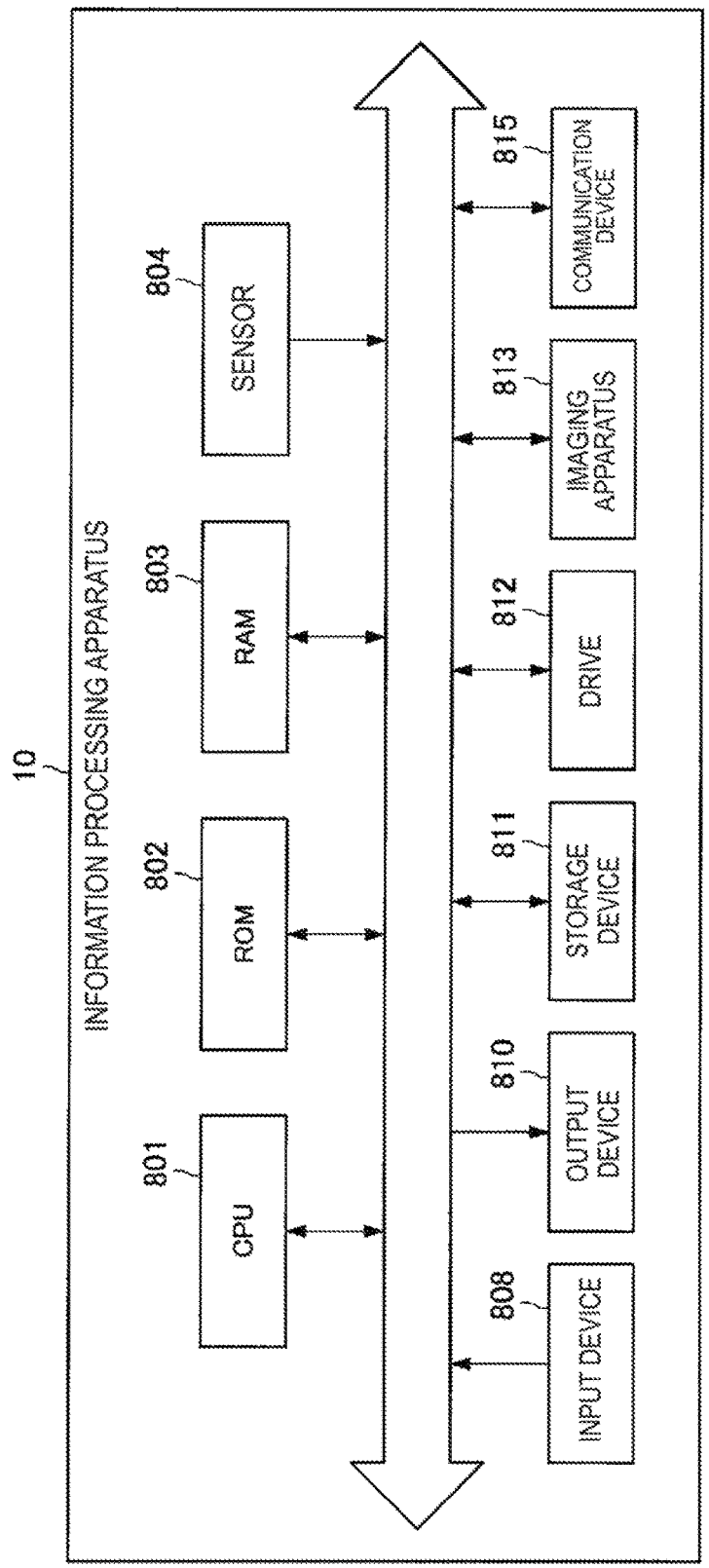

FIG. 26 is a diagram illustrating an example of hardware configuration of the information processing apparatus according to an embodiment of the present disclosure.

MODE(S) FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

In addition, the description will be made in the following order.
1. Overview of information processing system
2. Example of functional configuration of information processing system
3. Details of functions of information processing system
4. Example of hardware configuration of information processing system
5. Conclusion

1. OVERVIEW OF INFORMATION PROCESSING SYSTEM

First, apparatus cooperation which is currently widespread will be described. As techniques for the apparatus cooperation which is currently widespread, push reproduction such as moving image reproduction over the Internet, screen transmission performed using remote desktop, mirror cast (screen mirroring), or the like, window transmission performed using an X-window system or the like can be exemplified. However, designation or selection of a screen display destination apparatus is generally performed directly by a user. In this case, the designation or the selection by the user is generally performed with an apparatus name (a nickname or a host name) of a display destination apparatus, a model number, an IP address, or the like.

Here, in simple apparatus cooperation which is currently widespread, as described above, a technique for enabling a user to decide which function to allocate to which apparatus using an apparatus name or the like as a basis is generally adopted. However, in future, when advanced and flexible apparatus cooperation in accordance with an apparatus configuration or a user configuration (for example, a user configuration such as multi-user) is widespread, the foregoing technique is not convenient. The technique can be an obstacle to practical use of advanced and flexible apparatus cooperation.

Accordingly, a technology for automatically selecting which function is disposed to which apparatus with reference to a positional relation between the plurality of apparatuses and performance of the plurality of apparatuses has been examined (for example, see Non-Patent Literature 1). However, in the technology, a consideration of a case in which the number of users is plural (or a case in which the number of users is indeterminate) is insufficient. It is difficult to apply the technology to apparatus cooperation when the number of users is plural. The following example is an example of an application which is difficult to apply to apparatus cooperation when the number of users is plural.

(Application for Browsing Content Such as Photos)
    The number of browsers (users) is one in some cases or is plural in some cases.
    Some of the users participate in browsing of content at geographically distant locations in some cases.
    Some of the functions (selection of albums or the like) can be manipulated by only a specific user (can also be manipulated by a plurality of users).

(Application for TV Telephone)
    One person telephones with a telephone partner in some cases or telephones with several people in that place in some cases.
    A video or a voice of a telephone partner is viewed or listen by all the participants.
    The number of microphones or cameras (equivalent to ear receivers) used to speak to a partner is 1.
    A manipulation for volume adjustment is allowed to be performed by any participant.

(Application for Reading a Picture Book or a Picture-Story Show Aloud)
　　Some of the participants (browsers) are at remote locations in some cases.
　　A picture is allowed to be viewed by all the participants.
　　A manipulation (page ejection or the like) is allowed to be performed by only an organizer or a cooperator.
(Application for Producing and Editing Picture or the Like Jointly)
　　A canvas (drawing region) is allowed to be touched by all the participants.
　　A pen point of a brush is allowed to be selected by each participant with an apparatus at hand.
(Application for Taking Photographs (Remote Photographing))
　　The number of cameras used to perform imaging is set to be 1.
　　A manipulation (zoom adjustment, a shutter, or the like) can be performed by only a specific user (can also be performed by a plurality of users).

The examples of the applications which are difficult to apply to apparatus cooperation when the number of users is plural have been described above. In the present specification, a technology for enabling UI disposition in a plurality of cooperation apparatuses in a consideration of a plurality of users to be controlled will be mainly proposed. In addition, a technique for realizing disposition in cooperation apparatuses of UIs (hereinafter also referred to as "UI components") in consideration of even a plurality of users will be described below exemplifying "the application for browsing content such as photos.

Figure 1:
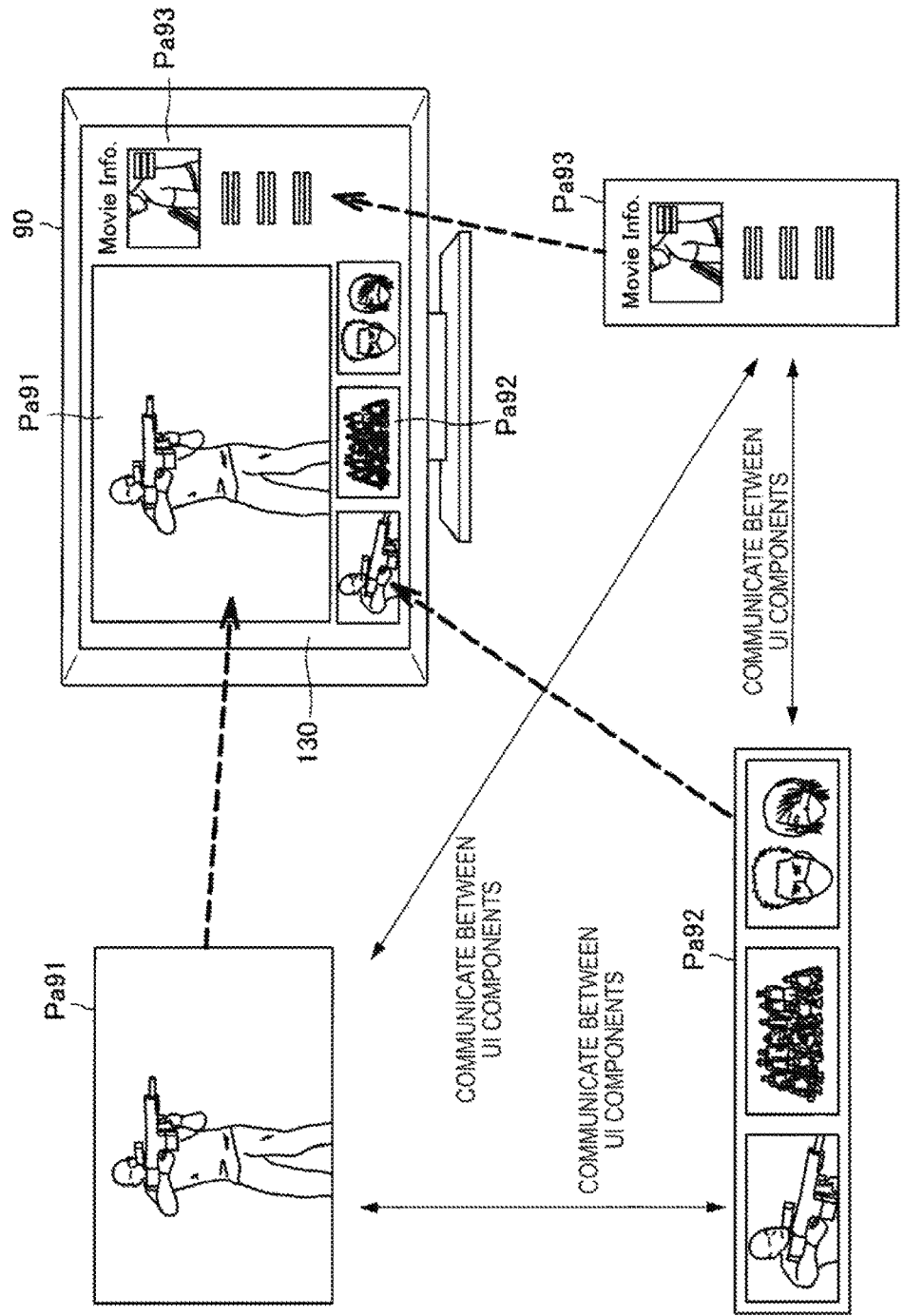
FIG. 1 is a diagram for describing a case in which a function of a moving image reproduction application is divided into UI component units.

Next, an overview of apparatus cooperation assumed in an embodiment of the present disclosure will be described. FIG. 1 is a diagram for describing a case in which a function of a moving image reproduction application is divided into UI component units. FIG. 1 illustrates an example in which functions of a moving image reproduction application are divided into UI component units (a UI component Pa91 for performing an output of a reproduced operation, a UI component Pa92 for performing a selection of a reproduction moving image, and a UI component Pa93 for displaying information regarding a moving image). However, the division number of functions of the moving image reproduction application is not particularly limited. Also, the type of application is not limited to the moving image reproduction application.

Also, as illustrated in FIG. 1, all the functions of the moving image reproduction application are realized through communication between the UI components (between the UI components Pa91 and Pa92, between the UI components Pa92 and Pa93, and between the UI components Pa93 and Pa91). In the example illustrated in FIG. 1, all the functions of the moving image reproduction application is realized in only one apparatus 90, and thus all the UI components are disposed in one apparatus 90.

Figure 2:
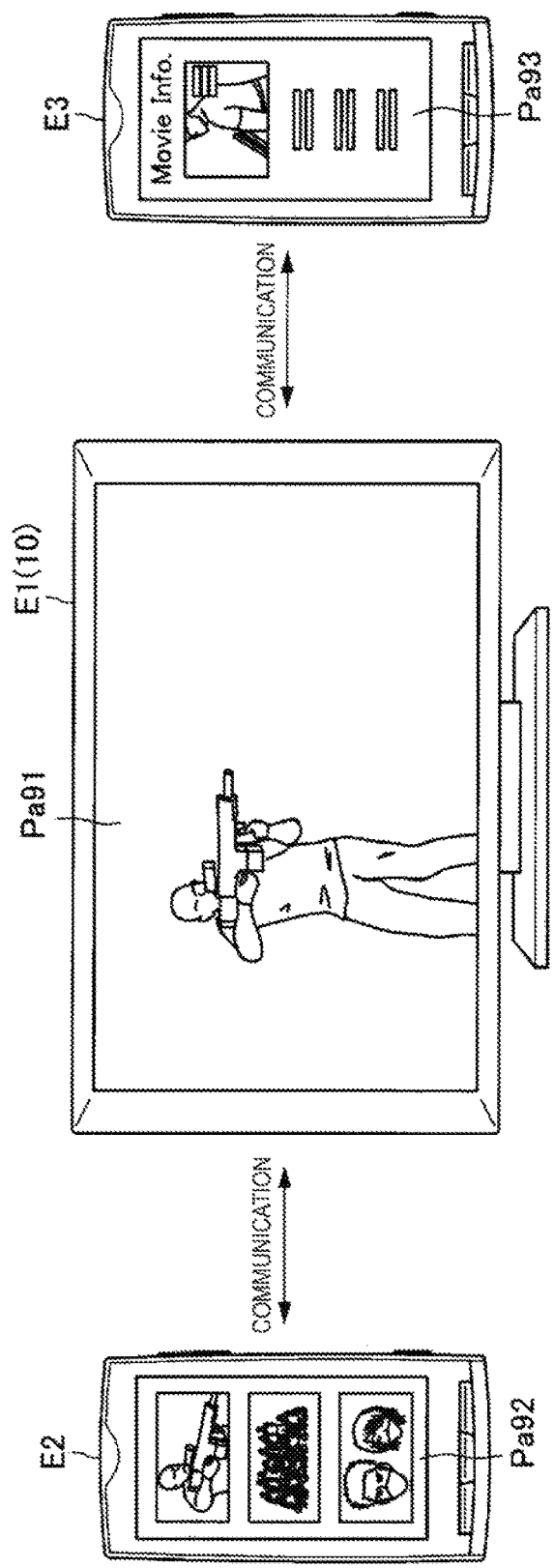
FIG. 2 is a diagram illustrating another example of the case in which the function of the moving image reproduction application is divided into the UI component units.

FIG. 2 is a diagram illustrating another example of the case in which the function of the moving image reproduction application is divided into the UI component units. FIG. 2 illustrates an example in which functions of a moving image reproduction application are divided into UI component units (a UI component Pa91, a UI component Pa92, and a UI component Pa93) as in the example illustrated in FIG. 1. Even in the example illustrated in FIG. 2, all the functions of the moving image reproduction application are realized through communication between the UI components as in the example illustrated in FIG. 1.

In the example illustrated in FIG. 2, however, unlike the example illustrated in FIG. 1, the functions of the moving image reproduction application are realized by a plurality of apparatuses (apparatuses E1 to E3). The UI component Pa91 is disposed in the apparatus E1, the UI component Pa92 is disposed n the apparatus E2, and the UI component Pa93 is disposed in the apparatus E3. In addition, in the example illustrated in FIG. 2, the number of cooperation apparatuses and the number of UI components are three together, but the number of cooperation apparatuses and the number of UI components are not limited.

In addition, in the present specification, a case in which the information processing apparatus 10 performing an operation of dividing the moving image reproduction application for each UI component and an operation of controlling disposition of the UI components is embedded in the apparatus E1 will be described. However, the information processing apparatus 10 may be incorporated in any of the plurality of apparatuses (the apparatuses E1 to E3) or may be embedded in an apparatus (a server or the like) other than the plurality of apparatuses (the apparatuses E1 to E3). Alternatively, the information processing apparatus 10 may be embedded in an apparatus appropriately selected from the plurality of apparatuses (the apparatuses E1 to E3).

The overview of the information processing system according to the embodiment of the present disclosure has been described above.

2. EXAMPLE OF FUNCTIONAL CONFIGURATION OF INFORMATION PROCESSING APPARATUS

Figure 3:
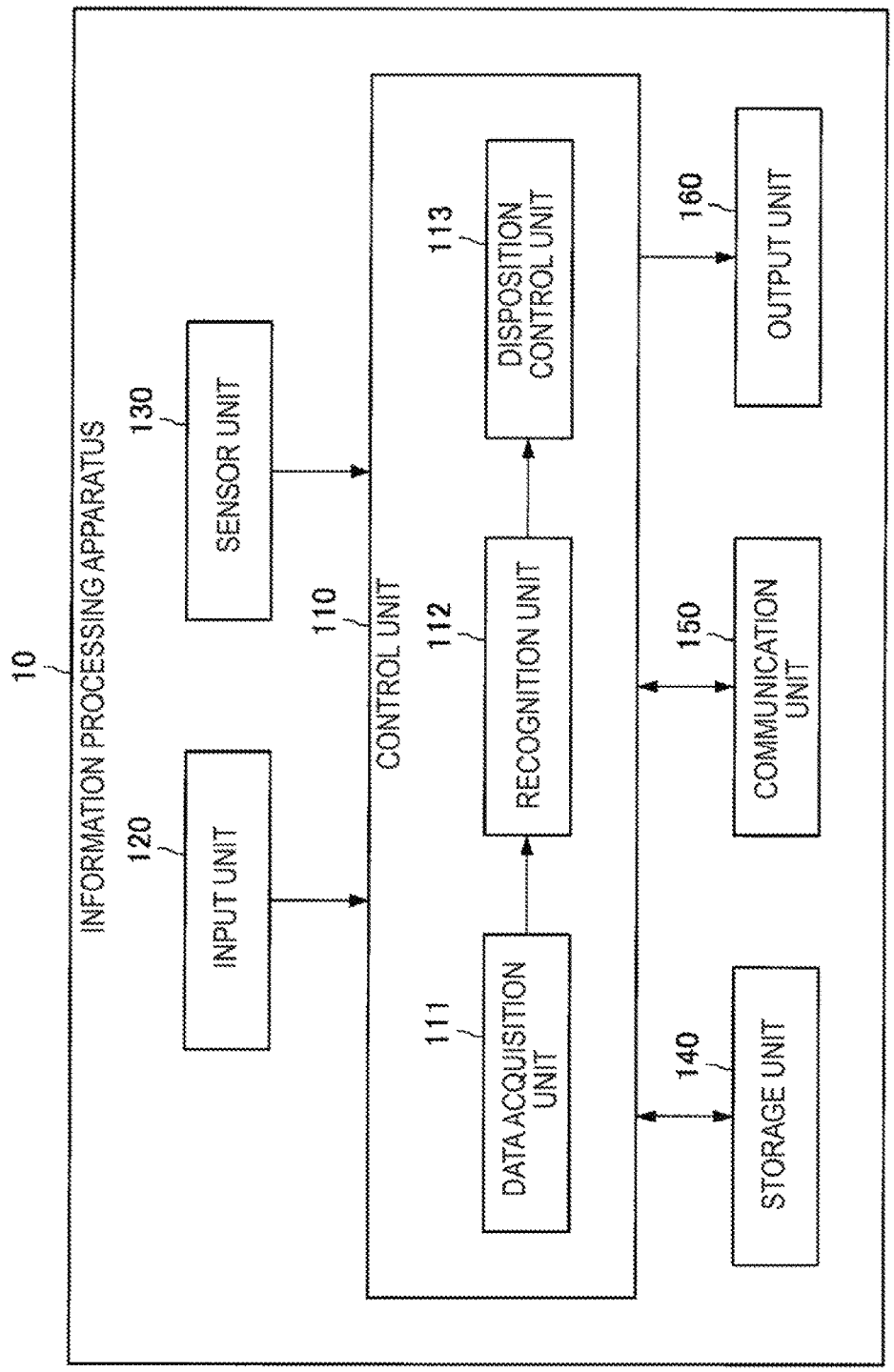
FIG. 3 is a diagram illustrating an example of a functional configuration of an information processing apparatus 10 according to an embodiment of the present disclosure.

Next, an example of a functional configuration of the information processing apparatus 10 according to an embodiment of the present disclosure will be described. FIG. 3 is a diagram illustrating an example of a functional configuration of the information processing apparatus 10 according to an embodiment of the present disclosure. As illustrated in FIG. 3, the information processing apparatus 10 includes a control unit 110, an input unit 120, a sensor unit 130, a storage unit 140, a communication unit 150, and an output unit 160.

The control unit 110 exhibits various functions of the control unit 110 by executing a program stored in the storage unit 140 or another storage medium. As illustrated in FIG. 3, the control unit 110 includes functional blocks of a data acquisition unit 111, a recognition unit 112, a disposition control unit 113, and the like. The details of the functions of these functional blocks will be described below.

In addition, the control unit 110 may be configured with a processor such as central processing unit (CPU), a graphics processing unit (GPU), a digital signal processor (DSP), or a system on chip (SoC). Also, the control unit 110 may be configured with an electronic circuit that performs various arithmetic processes.

The input unit 120 inputs a manipulation from a user and outputs the manipulation to the control unit 110. For example, when the information processing apparatus 10 is embedded in an apparatus such as a television receiver, the input unit 120 may be a button or the like. Also, when the information processing apparatus 10 is embedded in a mobile terminal such as a smartphone, the input unit 120 may be a touch panel or the like. In addition, in the example illustrated in FIG. 3, the input unit 120 is integrated with the information processing apparatus 10, but the input unit 120 may be configured to be separate from the information processing apparatus 10.

The sensor unit 130 detects predetermined sensor data and outputs the predetermined sensor data to the control unit 110. In the present specification, a case in which a camera module that captures an image is included has been described, but the sensor unit 130 may include another sensor. The sensor data detected by the sensor unit 130 is output to the control unit 110. In addition, in the example illustrated in FIG. 3, the sensor unit 130 is integrated with the information processing apparatus 10. However, the sensor unit 130 may be configured to be separate from the information processing apparatus 10.

The storage unit 140 stores a program that operates the control unit 110 by using a storage medium such as a semiconductor memory or a hard disk. Also, for example, the storage unit 140 can store various kinds of data to be used by the program. In addition, in the example illustrated in FIG. 3, the storage unit 140 is integrated with the information processing apparatus 10. However, the storage unit 140 may be configured to be separate from the information processing apparatus 10.

The communication unit 150 has a function of communicating with another apparatus under the control of the control unit 110. In the present specification, a case in which the communication unit 150 performs wireless communication with another apparatus via a network is assumed. However, the communication unit 150 may perform direct communication with another apparatus without involving a network. Also, the communication unit 150 may perform wired communication with another apparatus. In addition, in the example illustrated in FIG. 3, the communication unit 150 is integrated with the information processing apparatus 10. However, the communication unit 150 may be configured to be separate from the information processing apparatus 10.

The output unit 160 outputs various kinds of information under the control of the control unit 110. The output unit 160 may be realized by a liquid crystal display (LCD), may be realized by an organic electro-luminescence (EL) display, may be realized by a projector, or may be realized by a hologram display. In addition, in the example illustrated in FIG. 3, the output unit 160 is integrated with the information processing apparatus 10. However, the output unit 160 may be configured to be separate from the information processing apparatus 10.

The example of the functional configuration of the information processing apparatus 10 according to the embodiment of the present disclosure has been described.

3. DETAILS OF FUNCTIONS OF INFORMATION PROCESSING SYSTEM

Next, the details of functions of the information processing system will be described. In an embodiment of the present disclosure, the disposition control unit 113 controls UI disposition in a plurality of cooperation apparatuses performing a cooperation operation among a plurality of apparatuses on the basis of at least one of attributes of a plurality of users and a positional relation between the plurality of users and the plurality of apparatuses. In this configuration, the UI disposition in the plurality of cooperation apparatuses in consideration of the plurality of users can be controlled. In addition, the UI disposition by the disposition control unit 113 can be controlled specifically by conveying the disposition of the UI components from the disposition control unit 113 to the plurality of cooperation apparatuses via the communication unit 150.

Here, the positional relation between the plurality of users and the plurality of apparatuses may include information indicating information for identifying the users who are present near the plurality of apparatuses for each apparatus. For example, when there is an apparatus for which one or more users are recognized from a detection result obtained by a sensor corresponding to the apparatus (a sensor connected to the outside of the apparatus or a sensor embedded in the apparatus), the disposition control unit 113 may determine that one or more users are present near the apparatus.

The type of sensor is not particularly limited. However, for example, when the sensor is a camera, the data acquisition unit 111 may acquire an image captured by the camera. When the recognition unit 112 recognizes the face of one or more user from the image, it may be determined that one or more users are present near an apparatus corresponding to the camera. Here, a case in which a face recognition technology is used has been described. However, instead of the face recognition, it may be determined through voice recognition, fingerprint authentication, or the like that one or more users are present near an apparatus corresponding to a sensor.

Also, the disposition control unit 113 may control the UI disposition in the plurality of cooperation apparatus on the basis of not only the positional relation between the plurality of users and the plurality of apparatuses but also the attribute of each of the plurality of users. For example, the disposition control unit 113 may control the UI disposition in the plurality of cooperation apparatuses on the basis of the attribute of each of the plurality of users and an attribute condition defined for each UI. At this time, the disposition control unit 113 may decide disposition information indicating a combination of the cooperation apparatuses of disposition destinations of UIs in which the attribute of one or more users who are present near each of the plurality of cooperation apparatuses satisfies the attribute condition and may control the UI disposition in accordance with the disposition information.

An example in which the attribute of each of the plurality of users includes an authority given to each of the plurality of users will be mainly described below. However, the attribute of each of the plurality of users is not limited to the authority given to each of the plurality of users. Also, an example which is a condition that the attribute condition has an authority given by a target user group (attribute range) will be described below. However, the attribute condition is not limited to this example either.

Figure 4:
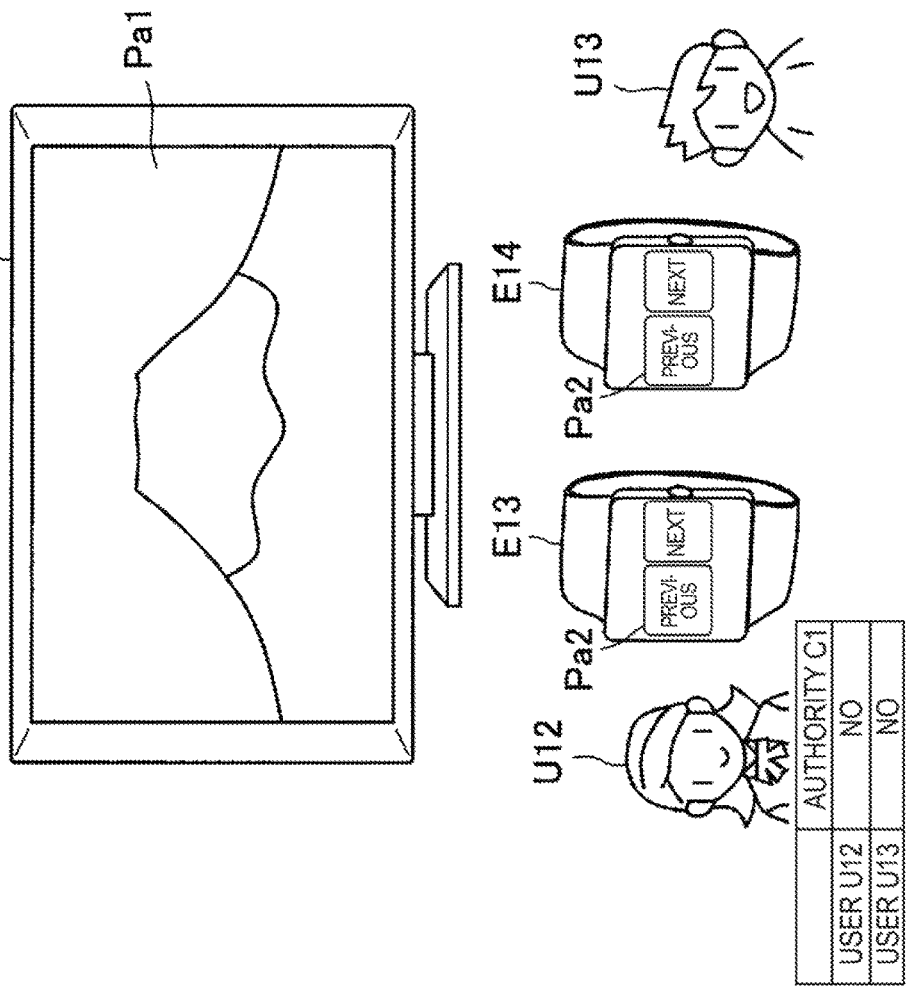
FIG. 4 is a diagram for describing an example of "an application for browsing content such as photos" corresponding to apparatus cooperation according to the embodiment of the present disclosure.

FIG. 4 is a diagram for describing an example of "an application for browsing content such as photos" corresponding to apparatus cooperation according to the embodiment of the present disclosure. In a spot A11 illustrated in FIG. 4, a user U11 who is an owner of a photo uses an application. The application includes a UI component Pa1 "photo display," a UI component Pa2 "basic manipulation," and a UI component Pa3 "extension manipulation."

"photo display" (the UI component Pa1) . . . displaying a browsing target photo itself to be large.

"basic manipulation" (the UI component Pa2) . . . inputting a basic manipulation such as "go to next photo" or "return to previous photo."

"extension manipulation" (the UI component Pa3) . . . inputting a special manipulation such as selection of an album owned by a user.

As illustrated in FIG. 4, in the spot A11, one apparatus E11 displays all the UI components (the UI component Pa1, the UI component Pa2, and the UI component Pa3). However, in accordance with an apparatus configuration in the spot A11, the UI components (the UI component Pa1, the UI component Pa2, and the UI component Pa3) may be distributed to a plurality of apparatuses.

Next, a case in which a plurality of users participate in browsing of photos in the application will be described. The plurality of users also including an owner may be in the same spot or may be in distant spots. In the example illustrated in FIG. 4, a case in which three users U11, U12, and U13 including an owner U11 browse photos and the users U12 and U13 other than the owner U11 are present together in a spot (the spot A12) distant from a spot (the spot A11) in which the owner U1f is present is assumed. For example, when the UI components are allocated to the apparatuses, the following policy may be adopted.

"Photo display" (the UI component Pa1) . . . it is necessary to dispose the UI component in an apparatus viewed from all the users (the UI component may be disposed in an apparatus present near all the users). Also, it is desirable to dispose the UI component in an apparatus which has a large display portion.

"basic manipulation" (the UI component Pa2) . . . it is preferable to dispose the UI component in an apparatus present near each of all the users (an apparatus present near each of all the users).

"extension manipulation" (the UI component Pa3) . . . it is desirable to dispose the UI component in an apparatus close at hand of only a user who has an authority C1 (an apparatus present near each of the users who have the authority C1). For example, an owner or a user acknowledged by the owner may be a user who has the authority C1.

In accordance with the foregoing allocation policy, as illustrated in FIG. 4, in the spot A11, there is only one apparatus E11 (for example, a smartphone) near the owner U1f. Therefore, it is desirable to dispose all the UI components (the UI components Pa1, Pa2, and Pa3) in the device E11.

On the other hand, in the spot A12, it is desirable to dispose "photo display" (the UI component Pa1) in an apparatus E12 (for example, a television receiver) which has a large display area and is present near two users (users U12 and U13). It is desirable to dispose "basic manipulation" (the UI component Pa2) in apparatuses E13 and E14 (for example, smart watches) worn by the users U12 and U13 (the users U12 and U13 are present nearby). Since the two users (the users U12 and 13) do not have the authority C1, it is desirable not to dispose "extension display" (the UI component Pa3) in any apparatus.

FIG. 5 is a diagram for describing another example of "the application for browsing content such as photos" corresponding to the apparatus cooperation according to the embodiment of the present disclosure. In the example illustrated in FIG. 5, a case in which three users U21, U22, and U23 including an owner U21 browse photos and the owner U21 and the user U22 are present together in a spot (the spot A21) distant from a spot (the spot A22) in which the user U23 is present is assumed.

In accordance with the foregoing allocation policy, as illustrated in FIG. 5, in the spot A21, it is desirable to dispose "photo display" (the UI component Pa1) in an apparatus E21 (for example, a television receiver) which has a large display area and is present near the owner U21 and the user U22. It is desirable to dispose "basic manipulation" (UI component Pa2) in an apparatus E22 (for example, a smartphone) and an apparatus E23 (for example, a smart watch) respectively present near the users U21 and U22. Since the user U22 does not have the authority C1, it is not desirable to dispose "extension display" (the UI component Pa3) in the apparatus E22 present near the user U21.

On the other hand, in the spot A22, it is desirable to dispose "photo display" (the UI component Pa1) in an apparatus E24 (for example, a television receiver) which has a large display area and is present near the U23. It is desirable to dispose "basic manipulation" (the UI component Pa2) in an apparatus E25 (for example, a smart watch) worn by the user U23 (present near the user U23). Since the user U23 does not have the authority C1, it is desirable not to dispose "extension display" (the UI component Pa3).

To specifically decide an apparatus to which the UI component is disposed depends on the following condition. Thus, it is difficult to assume all the combinations when an application is created.

How many cooperation apparatuses participate in apparatus cooperation and which apparatuses participate in the apparatus cooperation?

How many users participate and where the users participate, and which user has a special authority?

A positional relation between the users and the apparatuses.

In the apparatus cooperation, to be able to appropriately dispose the UI components in conformity to each situation, an application creator may designate annotation (hint information for disposition) in regard to UI components and an application may dynamically decide disposition of the UI components on the basis of the annotation. A mechanism for deciding the disposition of the UI components on the basis of the annotation can be generally used from various applications. Therefore, the mechanism may be prepared as a framework or a library and may be embedded in an application to improve productivity of the application creation.

An example of an annotation in "the application for browsing content such as photos" is illustrated in FIG. 6. Each row of FIG. 6 indicates each UI component and a value of annotation designated in regard to the UI component. The meaning of each item of the annotation is as follows.

"Apparatus type" . . . the types of apparatuses ("tv," "tablet," and the like) suitable for disposing the UI component are all written. As an order at the time of writing of the plurality of apparatus types, a more eligible apparatus type (with higher priority) is written ahead.

"Duplication policy" . . . it is indicated whether a UI component is permitted to be duplicately allocated to a plurality of apparatuses at the time of disposition of the UI component. As a value, one of the three following values is designated.

"single": a UI component is not duplicated.

"multi": a UI component is duplicated so that each user belonging to a target user group can use the UI component.

"mirror" a UI component is duplicated near each user belonging to a target user group (a UI component can be shared by a plurality of users).

"Target user group" . . . a target user group is designated in a case in which who use an apparatus is considered at the time of disposition of the apparatus (which is essential in "multi" or "mirror"). As a value, one of the following values is designated.

"all": all the users who use an application.

"gpN": all the users who have an authority N (where N=1, 2, 3, 4, . . . ).

The disposition control unit 113 may control the UI disposition in the plurality of cooperation apparatuses on the basis of the "positional relation" between the plurality of users and the plurality of apparatuses and the "duplication policy" indicating whether the UI duplication disposition in different cooperation apparatuses is permitted for each UI. As an example of a case in which the UI duplication disposition in the different apparatuses is not permitted, the foregoing "single" can be exemplified.

Also, when the duplication policy indicates that the UI duplication disposition in the different apparatuses is permitted, the duplication policy may further indicate whether the number of users is equal to the number of apparatuses to which UI component is allocated and the users are present near the plurality of cooperation apparatuses as a condition. As an example of the case in which the number of users is equal to the number of apparatuses to which UI component is allocated and the users are present near the plurality of cooperation apparatuses as the condition, the foregoing "multi" can be exemplified.

Also, when the duplication policy indicates that the UI duplication disposition in the different apparatuses is permitted, the duplication policy may further indicate whether one cooperation apparatus is present near each of the plurality of users and one user is present near each of the cooperation apparatuses to which UI component is allocated as a condition. As an example of the case in which one cooperation apparatus is present near each of the plurality of users and one user is present near each of the cooperation apparatuses to which UI component is allocated as a condition, the foregoing "mirror" can be exemplified.

In the example illustrated in FIG. 6, an apparatus eligible for disposing the UI component is designated by "apparatus type."

Also, in the example illustrated in FIG. 6, apparatus category names such as "tv" and "phone" are used as values of "apparatus type," but a scheme of designating the performance (the number of display pixels, the area of a display region, or the like) of an apparatus may be adopted. That is, the apparatus type may include information regarding one of at least the apparatus category and the apparatus performance.

FIG. 7 is a diagram illustrating an example in which the annotation illustrated in FIG. 6 is described by a program code in a hypertext markup language (HTML) tag format. In the example illustrated in FIG. 7, data-dev-type indicates the apparatus type, data-duplicate indicates duplication policy, and data-user-group indicates the target user group.

How to manage users who use applications depends on implantation of the applications. As an example, a method in which an owner user sends an invitation message using an electronic mail to a user who is allowed to participate in an application and the user receiving the invitation message logs in the application by performing a manipulation described in the message can be exemplified. When the owner user desires to give an authority N to a user, the invitation message may be changed in accordance with the authority N desired to be given to the user.

Figure 8:
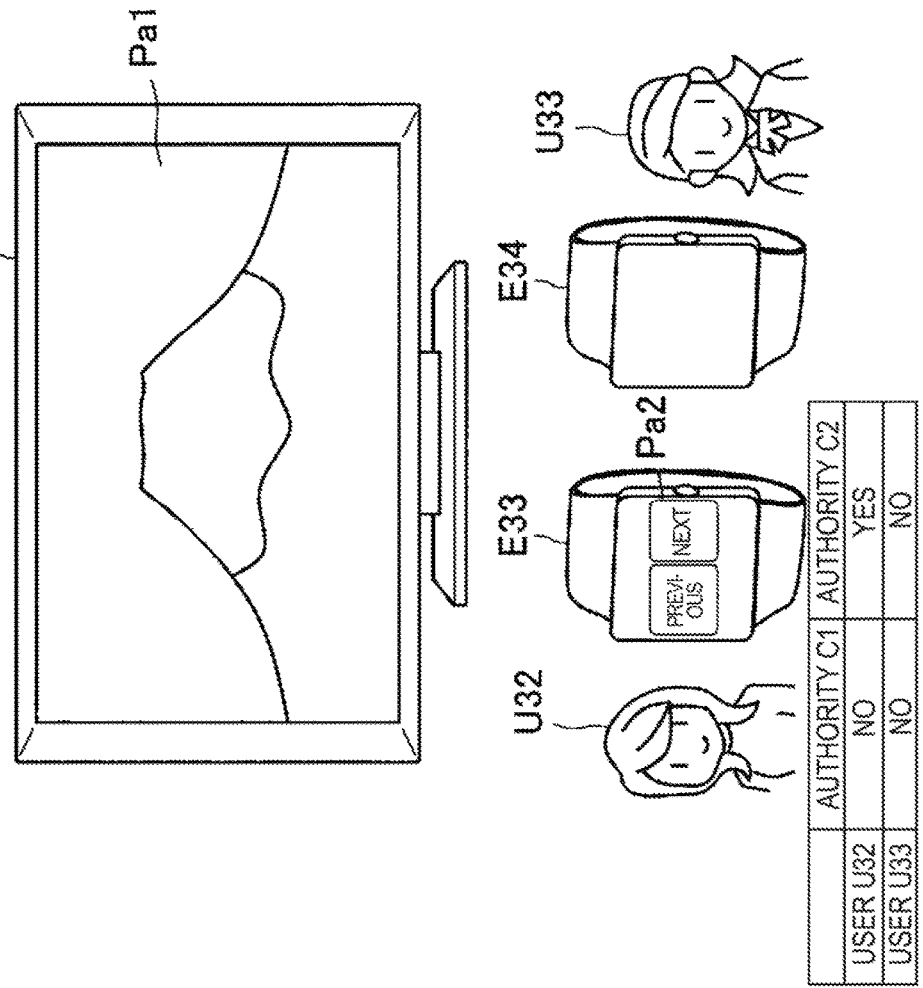
FIG. 8 is a diagram for describing still another example of "the application for browsing content such as photos" corresponding to the apparatus cooperation according to the embodiment of the present disclosure.

FIG. 8 is a diagram for describing still another example of "the application for browsing content such as photos" corresponding to the apparatus cooperation according to the embodiment of the present disclosure. In the example illustrated in FIG. 8, as in the example illustrated in FIG. 4, a case in which three users U21, U22, and U23 including an owner browse photos and the users U22 and U23 are present together in a spot (spot A32) distant from a spot (spot A31) in which the owner U21 is present is assumed. However, FIG. 8 illustrates an example in which annotation illustrated in FIG. 9 is used.

In the annotation illustrated in FIG. 9, whether the user has an authority C2 is also set in a target user group. That is, the UI component Pa2 is disposed in an apparatus present near the user who has the authority C2. In accordance with the annotation illustrated in FIG. 9, as illustrated in FIG. 8, the owner U31 has both the authority C1 and the authority C2 in the spot A31. Therefore, it is desirable to dispose "photo display" (the UI component Pa1), "basic manipulation" (the UI component Pa2), and "extension display" (the UI component Pa3) in an apparatus E31 (for example, a smartphone) present near the owner U31.

On the other hand, in the spot A32, it is desirable to dispose "photo display" (the UI component Pa1) in an apparatus E32 (for example, a television receiver) which has a large display area and is present near two users (users U32 and U33). Since the user U33 does not have the authority C2, it is desirable to dispose "basic manipulation" (the UI component Pa2) in an apparatus E33 (for example, a smart watch) worn by only the user U32 (present near the user U32). Since the two users (the users U32 and 33) do not have the authority C1, it is desirable not to dispose "extension display" (the UI component Pa3) in any apparatus.

Next, a method of deciding an apparatus of a disposition destination of each UI component on the basis of the designation of the annotation illustrated in the example in FIG. 6 or 7 will be described. FIG. 10 is a diagram illustrating a matrix representing disposition of UI components in apparatuses (hereinafter also referred to as a "disposition matrix"). Also, in the disposition matrix illustrated in FIG. 10, an entry in which "1" is set represents that the UI component in the column of the disposition matrix is allocated to apparatuses in the column. In the disposition matrix illustrated in FIG. 10, a blank entry in which "1" is not written represents that the UI component in the column is not allocated to apparatuses in the column ("0" is set as a value of the entry, but the column is drawn as a blank entry to easily view the matrix visually).

The disposition matrix illustrated in FIG. 10 indicates that a UI component [1] is disposed in all the apparatuses [1] to [3], a UI component [2] is disposed in the apparatus [2], and a UI component [3] is disposed in the apparatus [1].

FIG. 11 is a diagram illustrating a matrix in which only a column of one UI component is selected from the disposition matrix (hereinafter also referred to as a "disposition submatrix") illustrated in FIG. 10. The disposition submatrix illustrated in FIG. 11 indicates that a UI component [X] is disposed in the apparatus [3].

FIG. 12 is a diagram illustrating the flow of a process of deciding apparatuses to which each UI component is allocated. In a basic flow of the process illustrated in FIG. 12, a score in which disposition adequacy is reflected is obtained and a disposition matrix in which the score is highest is returned in all the combinations of the UI components and disposition destination apparatuses. In addition, in the process illustrated in FIG. 12, all the combinations are thoroughly examined to simplify the description. However, a calculation amount may be reduced using a technique such as "pruning of depth-first search" in artificial intelligence fields.

Specifically, the disposition control unit 113 sets "0" to the highest score (S11) and sets all of the entries of the disposition matrix to "0" (blank) (S12). Subsequently, the disposition control unit 113 sets a result of the score calculation (disposition matrix) in a variable S (S13). Here, "the score calculation (the disposition matrix) (S13)" is performed by invoking a process illustrated in FIG. 13. Subsequently, the disposition control unit 113 determines whether the variable S exceeds the highest score (S14).

Here, when the disposition control unit 113 determines that the variable S does not exceed the highest score (No in S14), the disposition control unit 113 causes the operation to proceed to S17. Conversely, when the disposition control unit 113 determines that the variable S exceeds the highest score (Yes in S14), the disposition control unit 113 sets the variable S in the highest score (S15) and sets the disposition matrix in the disposition matrix of the highest score (S16). When the operation proceeds to S17, the disposition control unit 113 sets a subsequent disposition matrix acquired "through subsequent disposition matrix acquisition (disposition matrix)" in the disposition matrix (S17).

Here, "the subsequent disposition matrix acquisition (disposition matrix) (S18)" is performed by invoking a process illustrated in FIGS. 20A and 20B. Subsequently, the disposition control unit 113 determines whether all the entries of the disposition matrix are "0" (S18). When all the entries of the disposition matrix are not "0" (No in S18), the operation proceeds to S13. When all the entries of the disposition matrix are "0" (Yes in S18), the disposition matrix of the highest score is returned and the operation ends.

FIG. 13 is a diagram illustrating the flow of a process for "score calculation (disposition matrix) invoked from the process illustrated in FIG. 12. In a basic flow of the process illustrated in FIG. 13, in accordance with a given disposition matrix, a score appropriate for each UI component in accordance with the duplication policy is obtained and a value obtained through summing in regard to all the UI components is returned as a whole score. Specifically, the disposition control unit 113 sets "0" in the score (S21) and sets "1" in a UI component number (S22). Subsequently, the disposition control unit 113 determines whether data-duplicate of the UI component [UI component number] is "multi" (S23).

When the disposition control unit 113 determines that data-duplicate of the UI component [UI component number] is "multi" (Yes in S23), the disposition control unit 113 sets an addition result of the score and the score calculation (UI component [UI component number], disposition submatrix [UI component number]) of the multi UI component in the score (S24) and causes the operation to proceed to S28. Here, "the score calculation (UI component [UI component number], disposition submatrix [UI component number]) of the multi UI component" is performed by invoking a process illustrated in FIG. 15.

Conversely, when the disposition control unit 113 determines that data-duplicate of the UI component [UI component number] is not "multi" (No in S23), the disposition control unit 113 determines whether data-duplicate of the UI component [UI component number] is "mirror" (S25). When the disposition control unit 113 determines that data-duplicate of the "UI component [UI component number] is "mirror" (Yes in S25), the disposition control unit 113 sets an addition result of the score and the score calculation (UI component [UI component number], disposition submatrix [UI component number]) of the mirror UI component in the score (S26) and causes the operation to proceed to S28. Here, "the score calculation (UI component [UI component number], disposition submatrix [UI component number]) of the mirror UI component" is performed by invoking processes illustrated in FIGS. 17 and 18.

When the disposition control unit 113 determines that data-duplicate of the "UI component [UI component number] is not "mirror" (No in S25), the disposition control unit 113 sets an addition result of the score and the score calculation (UI component [UI component number], disposition submatrix [UI component number]) of the single UI component in the score (S27) and causes the operation to proceed to S28. When the operation proceeds to U28, the disposition control unit 113 increases the UI component number by 1 (S28). When the UI component number does not exceed the number of UI components (No in S29), the operation proceeds to S23. Conversely, when the UI component number exceeds the number of UI components (Yes in S29), returns the score, and ends the operation.

Figure 14:
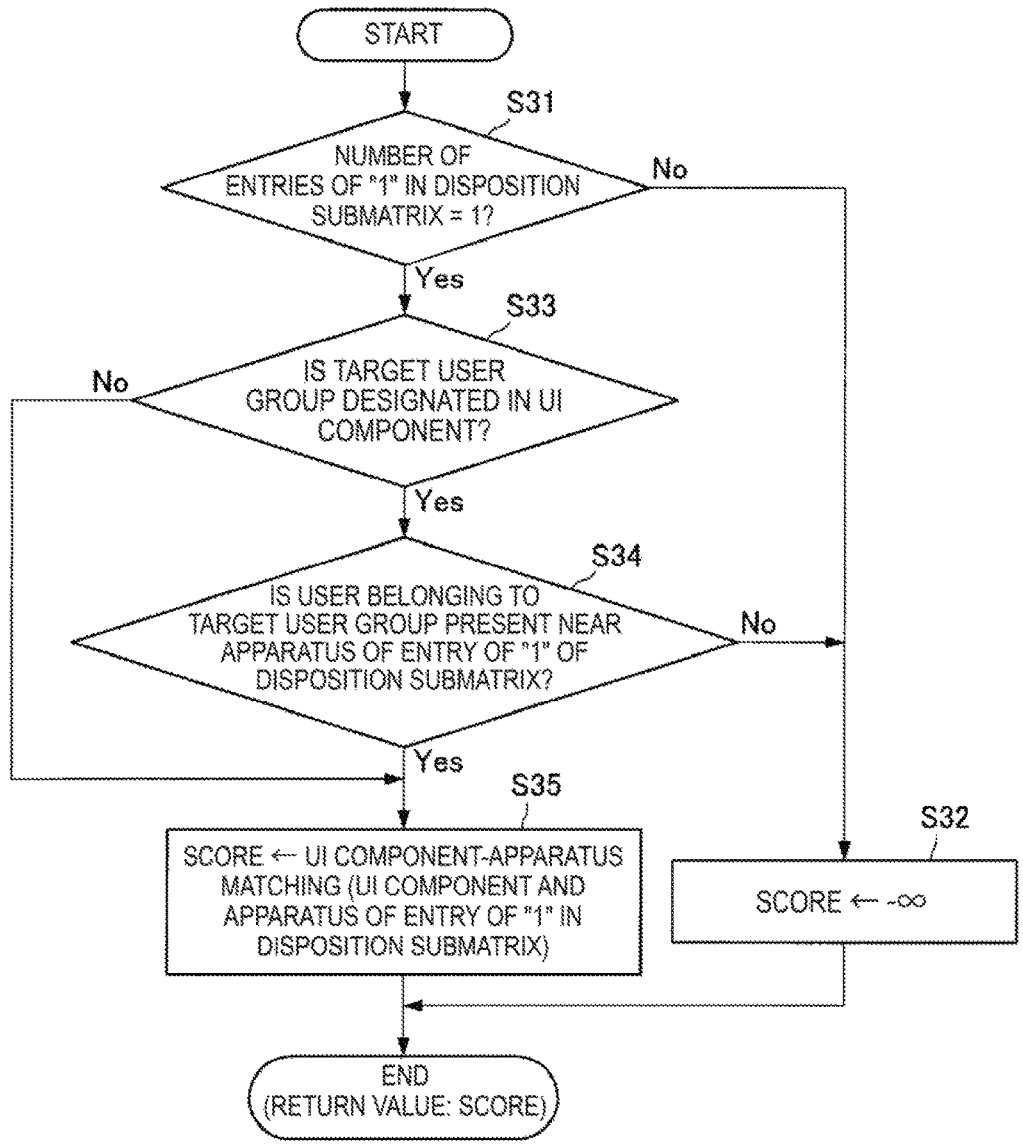
FIG. 14 is a diagram illustrating the flow of a process for "score calculation (UI component [UI component number]

FIG. 14 is a diagram illustrating the flow of a process for "score calculation (UI component [UI component number] and disposition submatrix [UI component number] of single UI component) invoked from the process illustrated in FIG. 13. When the duplication policy is the "single" UI component, designation of a target user group is not essential. It may be checked whether a corresponding user only a case in which a target user group is designated is present nearby. Here, "$-\infty$" set in a score may be a negative value ($-10000$ or the like) of which the absolute value is sufficiently larger than 100.

First, the disposition control unit 113 determines whether the number of entries of "1" in the disposition submatrix is "1" (S31). When the disposition control unit 113 determines that the number of entries of "1" in the disposition submatrix is not "1" (No in S31), the disposition control unit 113 causes the operation to proceed to S32. Conversely, when the disposition control unit 113 determines that the number of entries of "1" in the disposition submatrix is "1" (Yes in S31), the disposition control unit 113 determines whether a target user group is designated in the UI component (S33).

When the disposition control unit 113 determines that the target user group is not designated in the UI component (No in S33), the disposition control unit 113 causes the operation to proceed to S35. Conversely, when the disposition control unit 113 determines that the target user group is designated in the UI component (Yes in S33), the disposition control unit 113 determines whether a user belonging to the target user group is present near an apparatus of the entry of "1" in the disposition submatrix (S34).

When the disposition control unit 113 determines that the user belonging to the target user group is not present near the apparatus of the entry of "1" in the disposition submatrix (No in S34), the disposition control unit 113 sets "$-\infty$" in the score (S32), returns the score, and ends the operation. Conversely, when the disposition control unit 113 determines that the user belonging to the target user group is present near the apparatus of the entry of "1" in the disposition submatrix (Yes in S34), the disposition control unit 113 sets UI component-apparatus matching (the UI component and the apparatus of the entry of "1" in the disposition submatrix) in the score (S35), returns the score, and ends the operation.

In addition, "UI component-apparatus matching" in S35 is a value calculated through the following calculation.

$$\text{UI component-apparatus matching} = 100 \times (N-(n-)) \div N,$$

n: an order (1~) in which the apparatus type is written in annotation of the UI component; and N: a total number of apparatuses written as the apparatus type in the annotation of the UI component (the apparatus has a visual line detection function, and thus, a value of "UI component-apparatus matching" is increased by a predetermined value (for example, 10% or the like) when a visual line is detected. That is, when there is an apparatus in which a visual line of a user is detected from a detection result obtained by a corresponding sensor, the disposition control unit 113 may raise a value (the value of "UI component-apparatus matching") corresponding to a pair (apparatus-UI component) having the apparatus to be higher).

FIG. 15 is a diagram illustrating the flow of a process for "score calculation (UI component [UI component number] and disposition submatrix [UI component number] of multi UI component) invoked from the process illustrated in FIG. 13. Since the duplication policy is "multi," one-to-one correspondence is necessary between the apparatuses to which the UI component is allocated and the users belonging to the target user group. For example, as in FIG. 16, the pairs of apparatuses and users can be generated.

Therefore, the disposition control unit 113 confirms that the number of apparatuses to which the UI component is allocated is equal to the number of users belonging to the target user group, and then calculates a score when there is a combination in which the fact that a distance between the apparatus and user corresponding to each other is close is satisfied in all the pairs (apparatus-user) among all the combinations in which one-to-one correspondence is established between the apparatuses and the users (for example, there is a row in which the fact that the distance between the apparatus and the user is close is satisfied in all the pairs in the lower-side table of FIG. 16). When there is no combination, the disposition control unit 113 may set the score to $-\infty$.

First, the disposition control unit 113 determines whether the number of entries of "1" in the disposition submatrix is equal to the number of users belonging to the target user group of the UI component (S41). When the disposition control unit 113 determines that the number of entries of "1" in the disposition submatrix is not equal to the number of users belonging to the target user group of the UI component (No in S41), the disposition control unit 113 causes the operation to proceed to S48.

Conversely, when the disposition control unit 113 determines that the number of entries of "1" in the disposition submatrix is equal to the number of users belonging to the target user group of the UI component (Yes in S41), the disposition control unit 113 obtains all the combinations in which one-to-one correspondence pairs are established between the apparatuses of the entry of "1" of the disposition submatrix and the users belonging to the target user group of the UI component (S42) and sets "1" in combinations numbers (S43).

Subsequently, the disposition control unit 113 determines whether all the pairs of all <apparatuses & users> in the combinations [combination numbers] satisfy "the users close to the apparatuses" (S44). When the disposition control unit 113 determines that all the pairs of all <apparatuses & users> in the combinations [combination numbers] satisfy "the users close to the apparatuses" (Yes in S44), the disposition control unit 113 sets an average value of the values obtained for UI component-apparatus matching scores (the UI components and the apparatuses) in regard to the apparatuses of the entry of "1" in the disposition submatrix in the score (S45), returns the score, and ends the operation. Conversely, when the disposition control unit 113 determines that there is the pair of <apparatuses & users> in the combinations [combination numbers] does not satisfy "the users close to the apparatus" (No in S44), the disposition control unit 113 increases the combination number by 1 (S46) and determines whether the combination number exceeds the total number of combinations (S47).

When the disposition control unit 113 determines that the combination number does not exceed the total number of combinations (No in S47), the disposition control unit 113 causes the operation to proceed to S44. Conversely, when the disposition control unit 113 determines that the combination number exceeds the total number of combinations (Yes in S47), the disposition control unit 113 causes the operation to proceed to S48. When the operation proceeds to S48, the disposition control unit 113 sets $-\infty$ in the score (S48) and ends the operation. In addition, the "UI component-apparatus matching" in S45 can be calculated similarly with the "UI component-apparatus matching" in S35 illustrated in FIG. 14. Since the UI component in which the duplication policy is "multi" can be duplicately disposed in the plurality of apparatuses, an average value of the "UI component-apparatus matching" obtained in regard to the apparatuses may be used as the score.

FIGS. 17 and 18 are diagrams illustrating the flow of a process for "score calculation (UI component [UI component number] and a disposition submatrix [UI component number] of mirror UI component)" invoked from the process illustrated in FIG. 13. When the duplication policy is "mirror," the number of apparatuses to which the UI component is duplicately allocated may not necessarily be equal to the number of users belonging to the target user group unlike "multi."

However, it is not appropriate that there be an apparatus which is not used by anyone of target users or the user who is not present near an apparatus to which the UI component is allocated.

Therefore, the disposition control unit 113 may determine whether two conditions such as "an apparatus to which the UI component is allocated near all the target users" and "target users who are present near all the apparatuses to which the UI component is allocated" are satisfied and may set $-\infty$ in the score when the conditions are not satisfied.

First, the disposition control unit 113 sets "1" in a variable U (S51) and determines whether there is an apparatus which corresponds to an entry of "1" in the disposition matrix and is near a U-th user belonging to the target user group of the UI component (S52). When the disposition control unit 113 determines that there is no apparatus which corresponds to the entry of "1" in the disposition matrix and is present near the U-th user belonging to the target user group of the UI component (No in S52), the disposition control unit 113 causes the operation to proceed to S53.

Conversely, when the disposition control unit 113 determines that there is the apparatus which corresponds to the entry of "1" in the disposition matrix and is near the U-th user belonging to the target user group of the UI component (Yes in S52), the disposition control unit 113 increases the variable U by 1 (S54) and determines whether U exceeds the number of users belonging to the target user group of the UI component (S55). When the disposition control unit 113 determines that U does not exceed the number of users belonging to the target user group of the UI component (No in S55), the disposition control unit 113 causes the operation to proceed to S52.

Conversely, when the disposition control unit 113 determines that U exceeds the number of users belonging to the target user group of the UI component (Yes in S55), the disposition control unit 113 sets "1" in the apparatus number (S56) and determines whether the disposition submatrix [apparatus number] is "1" (S57). When the disposition control unit 113 determines whether the disposition submatrix [apparatus number] is not "1" (No in S57), the disposition control unit 113 causes the operation to proceed to S59.

Conversely, when the disposition control unit 113 determines that the disposition submatrix [apparatus number] is "1" (Yes in S57), the disposition control unit 113 determines whether there is a user who belongs to the target user group of the UI component and is near the apparatus [apparatus number] of the disposition submatrix (S58). When the disposition control unit 113 determines that there is no user who belongs to the target user group of the UI component and is near the apparatus [apparatus number] of the disposition submatrix (No in S58), the disposition control unit 113 sets "−∞" in the score (S53), returns the score, and ends the operation.

Conversely, when there is the user who belongs to the target user group of the UI component and is near the apparatus [apparatus number] of the disposition submatrix (Yes in S58), the disposition control unit 113 increases the apparatus number by 1 (S59) and determines whether the apparatus number exceeds the number of apparatuses (S60). When the disposition control unit 113 determines that the apparatus number does not exceed the number of apparatuses (No in S60), the disposition control unit 113 causes the operation to S57.

Conversely, when the disposition control unit 113 determines that the apparatus number exceeds the number of apparatuses (Yes in S60), the disposition control unit 113 sets an average value of values obtained for UI component-apparatus matching scores (the UI components and the apparatuses) in regard to the apparatuses of the entry of "1" in the score (S61), returns the score, and ends the operation.

In addition, the "UI component-apparatus matching" in S61 can be calculated similarly with the "UI component-apparatus matching" in S35 illustrated in FIG. 14. Since the UI component in which the duplication policy is "mirror" can be duplicately disposed in the plurality of apparatuses, an average value of the "UI component-apparatus matching" obtained in regard to the apparatuses may be used as the score. By using the average value as the score, the score is better when a sufficient number of UI components is allocated to apparatuses which are eligible types of higher apparatuses than when the UI components are allocated to a larger number of apparatuses than a necessary and sufficient number of apparatus (see FIG. 19).

In this way, when the "positional relation" between the plurality of users and the plurality of apparatuses is established, the disposition control unit 113 may generate a plurality of disposition matrixes (disposition candidate patterns) each including a pair group of the cooperation apparatuses of the disposition destination and UIs in which a condition related to the apparatus type is satisfied and the duplication policy is satisfied, calculate a score of each of the plurality of disposition matrixes, and decide a final disposition matrix from the plurality of disposition matrixes on the basis of the scores.

At this time, the disposition control unit 113 may calculate the score of the disposition matrix by summing values corresponding to the pairs of disposition matrixes. More specifically, the disposition control unit 113 may calculate the score of the disposition matrix by summing values corresponding to the apparatus types or the apparatus performances of the cooperation apparatuses of the disposition destinations in regard to the pairs of the disposition matrixes. For example, as described above, the disposition control unit 113 may calculate an average sore by dividing the score of each disposition matrix by the number of pairs and decide the disposition matrix in which the average score is the maximum as a final disposition matrix.

FIG. 20A is a diagram illustrating the flow of a process of obtaining "subsequent disposition matrix acquisition (disposition matrix)" invoked from FIG. 12. All the entries of the disposition matrix are in a "0" state (none of the UI components are applied to any apparatus) at first, the states of the entries of the disposition matrix are regularly changed one by one whenever the process of FIG. 20A is invoked once, and all the entries of the disposition matrix finally enter a "1" state (a state in which all the UI components are duplicately allocated to all the apparatuses).

Specifically, the disposition control unit 113 sets subsequent disposition matrix acquisition sub (disposition matrix, 1) in the disposition matrix (S71), returns the disposition matrix, and ends the operation. Here, "subsequent disposition matrix acquisition sub (disposition matrix, UI component number)" is performed by invoking a process illustrated in FIG. 20B. FIG. 20B is a diagram illustrating the flow of a process of obtaining "subsequent disposition matrix acquisition sub (disposition matrix, UI component number) invoked from FIG. 20A.

First, the disposition control unit 113 sets "1" in the apparatus number (S81) and determines whether the disposition matrix [UI component number] [apparatus number] is "1" (S82). When the disposition control unit 113 determines that the disposition matrix [UI component number] [apparatus number] is not "1" (No in S82), the disposition control unit 113 sets "1" in the disposition matrix [UI component number] [apparatus number] (S83), returns the disposition matrix, and ends the operation. Conversely, when the disposition control unit 113 determines that the disposition matrix [UI component number] [apparatus number] is "1" (Yes in S82), the disposition control unit 113 sets "0" in the disposition matrix [UI component number] [apparatus number] (S84), increases the apparatus number by 1 (S85), and determines whether the apparatus number exceeds the number of apparatuses (S86). When the disposition control unit 113 determines that the apparatus number does not exceed the number of apparatuses (No in S86), the disposition control unit 113 causes the operation to proceed to S82.

Conversely, when the disposition control unit 113 determines that the apparatus number exceeds the number of apparatuses (Yes in S86), the disposition control unit 113 determines whether the UI component number is equal to or greater than the number of UI component (S87). When the disposition control unit 113 determines that the UI component number is equal to or greater than the number of UI component (No in S87), the disposition control unit 113 recursively invokes subsequent disposition matrix acquisition sub (disposition matrix, UI component number+1), sets a return value obtained as the result in the disposition matrix (S88), returns the disposition matrix, and ends the operation. Conversely, when the disposition control unit 113 determines that the UI component number is less than the number of UI component (Yes in S87), the disposition control unit 113 returns the disposition matrix and ends the operation.

In this way, the disposition matrix corresponding to the highest score can be obtained through the process of FIG. 12 and the process invoked from FIG. 12. The disposition control unit 113 can operate an application by allocating each UI component included in the application to each cooperation apparatus participating in cooperation in accordance with the disposition matrix corresponding to the highest score to perform allocation to the apparatuses of the UI component in which a plurality of users are also considered.

As described above, when the "positional relation" between the plurality of users and the plurality of apparatuses is established, the disposition control unit 113 may decide the disposition matrix (disposition information) indicating a combination of the cooperation apparatuses of disposition destinations of UIs in which the duplication policy is satisfied and control the UI disposition in accordance with the decided disposition matrix. At this time, as described above, the apparatus type may be considered. That is, when the "positional relation" between the plurality of users and the plurality of apparatuses is established, the disposition control unit 113 may decide disposition information which belongs to the apparatus type indicating the type of cooperation apparatus of the disposition destination for each UI and satisfies the duplication policy.

The scheme proposed in the present specification is not limited to the "application for browsing content such as photos" as in the example of FIG. 4 and can be generally used for various applications. For each UI component included in the application, the apparatus type, the duplication policy, and the target user group can be appropriately set as the annotation.

FIGS. 21 to 25 are a diagram illustrating a designation example of annotation in "an application for browsing content such as photos" described so far and a diagram illustrating a designation example of annotation in "an application for a TV telephone," a diagram illustrating a designation example of annotation in "an application for reading a picture book or a picture-story show aloud," a diagram illustrating a designation example of annotation in "an application for producing and editing a picture or the like jointly," and a diagram illustrating a designation example of annotation in "an application for taking photographs (remote photographing)" exemplified above as the example.

The details of the functions of the information processing system according to the embodiment of the present disclosure have been described above.

4. EXAMPLE OF HARDWARE CONFIGURATION OF INFORMATION PROCESSING APPARATUS

Subsequently, an example of hardware configuration of the information processing apparatus 10 according to an embodiment of the present disclosure will be described. FIG. 26 is a diagram illustrating an example of hardware configuration of the information processing apparatus 10 according to an embodiment of the present disclosure. However, the example of hardware configuration illustrated in FIG. 26 is merely an example of hardware configuration of the information processing apparatus 10. Therefore, the hardware configuration of the information processing apparatus 10 is not limited to the example illustrated in FIG. 26.

As illustrated in FIG. 26, the information processing apparatus 10 include a central processing unit (CPU) 801, read only memory (ROM) 802, random access memory (RAM) 803, a sensor 804, an input device 808, an output device 810, a storage device 811, a drive 812, an imaging apparatus 813, and a communication device 815.

The CPU 801 functions as an arithmetic processing unit and a controller, and controls overall operations inside the information processing apparatus 10 according to various programs. Also, the CPU 801 may be a microprocessor. The ROM 802 stores programs or arithmetic parameters data and the like which are used by the CPU 801. The RAM 803 temporarily stores programs which are used in the execution of the CPU 801, or parameters which are appropriately changed upon execution thereof. Those are mutually connected with each other through a host bus configured from a CPU bus or the like.

The sensor 804 includes various detection sensors, such as a state detection sensor for detecting a state of the information processing apparatus 10, and peripheral circuits thereof. Examples of the sensor 804 may include a positioning sensor, a tilt sensor, an acceleration sensor, a gyro sensor, a direction sensor, a temperature sensor, a humidity sensor, and an illuminance sensor. A signal detected by the sensor 804 is transmitted to the CPU 801. In this way, the CPU 801 can know the state (position, tilt, acceleration, angular velocity, direction, temperature, humidity, illumination, or the like) of the information processing apparatus 10.

The input device 808 includes an operation unit configured to allow the user to input information, such as a mouse, a keyboard, a touch panel, a button (power button or the like), a microphone, a switch, a dial, and a lever, and an input control circuit configured to generate an input signal based on a user input and output the input signal to the CPU 801. The user of the information processing apparatus 10 can input various data or give instruction on the processing operations to the information processing apparatus 10 by operating the input device 808. Also, the installation position of the operation unit is not particularly limited. For example, the operation unit may be installed on a housing side surface of the information processing apparatus 10, or may be installed on the same surface as the surface on which a display is installed.

The output device 810 may include a display device such as, for example, a liquid crystal display (LCD), an organic light emitting diode (OLED), and a lamp. Further, the output device 810 may include an audio output device such as a speaker and a headphone. For example, the display device displays a captured image or a generated image. On the other hand, the audio output device converts audio data or the like into audio.

The storage device 811 is a device for data storage that is configured as an example of the storage unit of the information processing apparatus 10. The storage device 811 may include a storage medium, a recording device that records data in the storage medium, a reading device that reads data from the storage medium, and an erasing device that erases data recorded on the storage medium. The storage device 811 stores programs or various data which are executed by the CPU 801.

The drive 812 is a reader/writer for storage medium and is internally or externally mounted in the information processing apparatus 10. The drive 812 reads information recorded in a removable storage medium, such as a magnetic disk, an optical disk, a magneto-optical disk, or a semiconductor memory mounted thereon, and outputs the read information to the RAM 803. Also, the drive 812 can write information to the removable storage medium.

The imaging apparatus 813 is an apparatus that images the real space using an image sensor such as a charge coupled device (CCD) or a complementary metal oxide semiconductor (CMOS) and various members such as a lens for controlling formation of a subject image in the image sensor and generates a captured image. The imaging apparatus 813 may capture a still image or may capture a moving image.

The communication device 815 communicates with an external device through a network (or directly). The communication device 815 may be an interface for wireless communication. For example, the communication device 815 may include a communication antenna, a radio frequency (RF) circuit, a baseband processor, and the like. Specific examples of the interface for wireless communication may include a communication unit such as a modem supporting a communication scheme, such as a code division multiple access (CDMA), a wideband code division multiple access (W-CDMA), a long term evolution (LTE), a wireless fidelity (Wi-Fi, registered trademark).

Also, the communication device 815 may be an interface for wired communication. For example, the communication device 815 may include a connection terminal, a transmission circuit, and a circuit for other communication processing. Also, the CPU 801 and the communication device 815 may be configured by a single chip, or may be implemented as separate devices. Also, although not illustrated in FIG. 26, the information processing apparatus 10, for example, may be driven by power supplied from a power source such as a rechargeable battery, and the power source may be configured to be detachable from the information processing apparatus 10.

In the above, the example of hardware configuration of the information processing apparatus 10 according to an embodiment of the present disclosure has been described. For example, the output unit 160 and the storage unit 140 can be realized by the output device 810 and the storage device 811, respectively. Also, the control unit 110 can be realized by the CPU 801. Therefore, a program causing a computer to function as the information processing apparatus 10 including the control unit 110 can be stored in the storage device 811, the ROM 802, or the RAM 803, and the CPU 801 can execute the relevant program.

If the operation of the above-described information processing apparatus 10 is realized, the position of each constituent illustrated in FIG. 3 is not particularly limited. As a specific example, the input unit 120, the sensor unit 130 and the output unit 160, and the control unit 110 and the storage unit 140 may be provided in different information processing devices connected through the network. In this case, the information processing device in which the control unit 110 and the storage unit 140 are provided, for example, may correspond to a server such as a web server or a cloud server, and the input unit 120, the sensor unit 130 and the output unit 160 may correspond to a client connected to the network.

5. CONCLUSION

As described above, according to an embodiment of the present disclosure, there is provided an information processing apparatus including a disposition control unit configured to control UI disposition in a plurality of cooperation apparatuses performing a cooperation operation among a plurality of apparatuses on the basis of at least one of attributes of a plurality of users and a positional relation between the plurality of users and the plurality of apparatuses. In this configuration, it is possible to control the UI disposition in the plurality of cooperation apparatuses in consideration of a plurality of users.

According to an embodiment of the present disclosure, advanced and flexible apparatus cooperation also including correspondence of a plurality of users can be provided in a form easily used by a user. Also, according to an embodiment of the present disclosure, even when an apparatus cooperation application is used by a plurality of people, each user can freely perform browsing or manipulation. Further, according to an embodiment of the present disclosure, when an apparatus cooperation application is used by a plurality of people, a user having no authority can be prevented from performing an unauthorized act.

Also, according to an embodiment of the present disclosure, it is possible to also cope with a case in which some of the users using an apparatus cooperation application are in remote spots. Also, according to an embodiment of the present disclosure, when an application performing advanced and flexible apparatus cooperation also including correspondence of a plurality of users is created, it is possible to obtain the advantageous effect in which a burden on an application creator is not considerably greater than when an application for only a single apparatus is created.

The preferred embodiments of the present disclosure have been described in detail with reference to the appended drawings, but the technical scope of the present disclosure is not limited to such examples. It should be understood by those skilled in the art that it is apparent that various modifications and alterations may occur within the scope of technical idea described in the appended claims and this is understood that it naturally belongs to the technical range of the disclosure.

For example, the operation of the information processing apparatus 10 is not necessarily performed in time series in order described in the flowchart. For example, the operation of the information processing apparatus 10 may be performed in a different order from that described in the flowchart, or at least a part of the operation described in the flowchart may be performed in parallel.

Further, a program for causing hardware, such as a CPU, ROM and RAM built into a computer, to exhibit functions similar to the configuration included in the above described information processing apparatus 10 can be created. Further, a recording medium can also be provided which records these programs and is capable of performing reading to the computer.

Also, the effects described herein are only for illustrative or explanatory purposes, not limiting purposes. That is, it is apparent to those skilled in the art that other effects from the description herein can be provided, in addition to or alternative to the above effects, in the relevant technology in the disclosure.

Additionally, the present technology may also be configured as below.

(1)

An information processing apparatus including:

a disposition control unit configured to control UI disposition in a plurality of cooperation apparatuses performing a cooperation operation among a plurality of apparatuses on the basis of at least one of attributes of a plurality of users and a positional relation between the plurality of users and the plurality of apparatuses.

(2)

The information processing apparatus according to (1), wherein the disposition control unit controls the UI disposition in the plurality of cooperation apparatuses on the basis of the positional relation and a duplication policy indicating whether UI duplication disposition in different apparatuses is permitted for each UI.

(3)

The information processing apparatus according to (2), wherein, when the duplication policy indicates that the UI duplication disposition in the different apparatuses is permitted, the duplication policy further indicates as a condition whether the number of users is equal to the number of apparatuses to which a UI component is allocated and users are present near the plurality of cooperation apparatuses.

(4)

The information processing apparatus according to (2), wherein, when the duplication policy indicates that the UI duplication disposition in the different apparatuses is permitted, the duplication policy further indicates as a condition whether one cooperation apparatus is present near each of the plurality of users and one user is present near each of the cooperation apparatuses to which a UI component is allocated.

(5)

The information processing apparatus according to any one of (2) to (4), wherein, when the positional relation is established, the disposition control unit decides disposition information indicating a combination of the cooperation apparatuses of disposition destinations of UIs in which the duplication policy is satisfied and controls the UI disposition in accordance with the disposition information.

(6)

The information processing apparatus according to (5), wherein, when the positional relation is established, the disposition control unit decides the disposition information in which a condition related to an apparatuses type indicating a type of a cooperation apparatus of the disposition destination for each UI is satisfied and the duplication policy is satisfied.

(7)

The information processing apparatus according to (6), wherein the apparatus type includes information regarding one of at least an apparatus category and an apparatus performance.

(8)

The information processing apparatus according to (6) or (7), wherein, when the positional relation is established, the disposition control unit generates a plurality of disposition candidate patterns belonging to the apparatus type and each including a pair group of the cooperation apparatuses of the disposition destinations and the UIs in which the duplication policy is satisfied, calculates a score of each of the plurality of disposition candidate patterns, and decides the disposition information from the plurality of disposition candidate patterns on the basis of the scores.

(9)

The information processing apparatus according to (8), wherein the disposition control unit calculates the score of the disposition candidate pattern by summing values corresponding to the pairs of disposition candidate patterns.

(10)

The information processing apparatus according to (9), wherein the disposition control unit calculates the score of the disposition candidate pattern by summing values corresponding to apparatus types or apparatus performances of the cooperation apparatuses of the disposition destinations in regard to the pairs of disposition candidate patterns.

(11)

The information processing apparatus according to (9) or (10), wherein the disposition control unit calculates an average score by dividing the score of each disposition candidate pattern by the number of pairs and decides a disposition candidate pattern in which the average score is maximum as the disposition information.

(12)

The information processing apparatus according to any one of (9) to (11), wherein, when there is an apparatus in which a visual line of a user is detected from a detection result obtained by a corresponding sensor, the disposition control unit raises a value corresponding to the pair having the apparatus.

(13)

The information processing apparatus according to any one of (1) to (12), wherein the disposition control unit controls the UI disposition in the plurality of cooperation apparatuses on the basis of the attribute of each of the plurality of users.

(14)

The information processing apparatus according to (13), wherein the attribute of each of the plurality of users includes at least an authority given to each of the plurality of users.

(15)

The information processing apparatus according to (13) or (14), wherein the disposition control unit controls the UI disposition in the plurality of cooperation apparatuses on the basis of the attribute of each of the plurality of users and an attribute condition defined for each UI.

(16)

The information processing apparatus according to (15), wherein the disposition control unit decides disposition information in which the attribute of one or more users who are present near each of the plurality of cooperation apparatuses satisfies the attribute condition.

(17)

The information processing apparatus according to (16), wherein, when there is an apparatus for which one or more users are recognized from a detection result obtained by a corresponding sensor, the disposition control unit determines that the one or more users are present near the apparatus.

(18)

The information processing apparatus according to any one of (1) to (17), wherein the positional relation includes information indicating information for identifying users who are present near the plurality of apparatuses for each apparatus.

(19)

An information processing method including: controlling UI disposition in a plurality of cooperation apparatuses performing a cooperation operation among a plurality of apparatuses on the basis of at least one of attributes of a plurality of users and a positional relation between the plurality of users and the plurality of apparatuses.

(20)

A program for causing a computer to function as:

an information processing apparatus including a disposition control unit configured to control UI disposition in a plurality of cooperation apparatuses performing a cooperation operation among a plurality of apparatuses on the basis of at least one of attributes of a plurality of users and a positional relation between the plurality of users and the plurality of apparatuses.

REFERENCE SIGNS LIST

10 information processing apparatus
110 control unit
111 data acquisition unit
112 recognition unit
113 disposition control unit
120 input unit
130 sensor unit
140 storage unit
150 communication unit
160 output unit
E11 to E13 apparatuses E21 to E25 apparatuses
E31 to E33 apparatuses
Pa1 to Pa3 UI components
U11 to U13 users
U21 to U23 users
U31 to U33 users

The invention claimed is:

1. An information processing apparatus, comprising:
a central processing unit (CPU) configured to:
determine a value corresponding to at least one pair of a cooperation apparatus and a user interface (UI) component among a plurality of cooperation apparatuses and a plurality of UI components of a UI, based on detection of a user presence in proximity to the cooperation apparatus of the at least one pair of the cooperation apparatus and the UI component; and
control a disposition of the UI in the plurality of cooperation apparatuses based on the value,
wherein the plurality of cooperation apparatuses is configured to execute a cooperation operation among the plurality of cooperation apparatuses,
wherein
the CPU is further configured to control the disposition of the UI based on a positional relation between a plurality of users and the plurality of cooperation apparatuses and a duplication policy,
the duplication policy indicates whether UI duplication disposition in the plurality of cooperation apparatuses is permitted for each UI component of the plurality of UI components, and
based on establishment of the positional relation, the CPU is further configured to:
generate a plurality of disposition candidate patterns belonging to an apparatus type,
wherein
each disposition candidate pattern of the plurality of disposition candidate patterns includes a pair group of the plurality of cooperation apparatuses of a plurality of disposition destinations of the plurality of UI components and the UI components in which the duplication policy is satisfied, and
the apparatus type indicates a type of a cooperation apparatus of one of the plurality of disposition destinations for each UI component of the plurality of UI components;
calculate a score of each disposition candidate pattern of the plurality of disposition candidate patterns;
determine disposition information from the plurality of disposition candidate patterns using the calculated score,
wherein the determined disposition information indicates a combination of the plurality of cooperation apparatuses of the plurality of disposition destinations of the plurality of UI components, the combination satisfies the duplication policy, and the disposition information satisfies a condition related to the apparatus type and the duplication policy; and
control the disposition of the UI based on the disposition information.

2. The information processing apparatus according to claim 1,
wherein, for the duplication policy that indicates that the UI duplication disposition in the plurality of cooperation apparatuses is permitted for a UI component, the duplication policy further indicates:
a number of the plurality of users is equal to a number of the plurality of cooperation apparatuses to which the UI component is allocated, and
the plurality of users present within a range of a plurality of sensors,
wherein the plurality of sensors is associated with the plurality of cooperation apparatuses.

3. The information processing apparatus according to claim 1,
wherein, for the duplication policy that indicates that the UI duplication disposition in the plurality of cooperation apparatuses is permitted for a UI component, the duplication policy further indicates:
presence of one cooperation apparatus in proximity to each user of the plurality of users, and
presence of one user in proximity to each cooperation apparatus of the plurality of cooperation apparatuses to which the UI component is allocated.

4. The information processing apparatus according to claim 1,
wherein the apparatus type includes information associated with at least one of an apparatus category and an apparatus performance.

5. The information processing apparatus according to claim 1,
wherein CPU is further configured to calculate the score of one disposition candidate pattern of the plurality of disposition candidate patterns based on a first sum value corresponding to pairs of the plurality of disposition candidate patterns.

6. The information processing apparatus according to claim 5,
wherein the CPU is further configured to calculate the score of the one disposition candidate pattern of the plurality of disposition candidate patterns based on a second sum value corresponding to at least one of apparatus types or apparatus performances of the plurality of cooperation apparatuses with respect to the pairs of the plurality of disposition candidate patterns.

7. The information processing apparatus according to claim 5,
wherein the CPU is further configured to:
calculate an average score based on division of the calculated score of the each disposition candidate pattern of the plurality of disposition candidate patterns by a number of pairs of the plurality of disposition candidate patterns; and
determine a disposition candidate pattern of the plurality of disposition candidate patterns in which the calculated average score is maximum as the disposition information.

8. The information processing apparatus according to claim 5,
wherein, based on a determination that a user visual line corresponding to the cooperation apparatus is detected from a detection result obtained by a corresponding sensor, the CPU is further configured to increase the value corresponding to the at least one pair having the cooperation apparatus.

9. The information processing apparatus according to claim 1,
wherein the CPU is further configured to control the disposition of the UI in the plurality of cooperation apparatuses based on an attribute of each user of the plurality of users.

10. The information processing apparatus according to claim 9, wherein the attribute of each user of the plurality of users includes at least an authority given to each user of the plurality of users.

11. The information processing apparatus according to claim 9,
wherein the CPU is further configured to control the disposition of the UI in the plurality of cooperation apparatuses based on the attribute of each user of the plurality of users and an attribute condition defined for the UI.

12. The information processing apparatus according to claim 11,
wherein the CPU is further configured to determine the disposition information in which the attribute of at least one user who is present in proximity to each cooperation apparatus of the plurality of cooperation apparatuses satisfies the attribute condition.

13. The information processing apparatus according to claim 12,
wherein the CPU is further configured to determine that at least one user is present in proximity to one of the plurality of cooperation apparatuses based on the cooperation apparatus for which the at least one user is recognized from a detection result obtained by a sensor.

14. The information processing apparatus according to claim 1,
wherein the positional relation includes information indicating information that identifies the plurality of users present in proximity to the plurality of cooperation apparatuses for each cooperation apparatus.

15. An information processing method, comprising:
determining, by a central processing unit (CPU), a value corresponding to at least one pair of a cooperation apparatus and a user interface (UI) component among a plurality of cooperation apparatuses and a plurality of UI components of a UI, based on detection of a user presence in proximity to the cooperation apparatus of the at least one pair of the cooperation apparatus and the UI component;
controlling, by the CPU, disposition of the UI in the plurality of cooperation apparatuses based on the value, wherein the plurality of cooperation apparatuses is configured to execute a cooperation operation among the plurality of cooperation apparatuses; and
controlling, by the CPU, the disposition of the UI based on a positional relation between a plurality of users and the plurality of cooperation apparatuses and a duplication policy,
wherein
the duplication policy indicates whether UI duplication disposition in the plurality of cooperation apparatuses is permitted for each UI component of the plurality of UI components, and
based on establishment of the positional relation, controlling the disposition of the UI further comprises:
generating, by the CPU, a plurality of disposition candidate patterns belonging to an apparatus type, wherein
each disposition candidate pattern of the plurality of disposition candidate patterns includes a pair group of the plurality of cooperation apparatuses of a plurality of disposition destinations of the plurality of UI components and the UI components in which the duplication policy is satisfied, and the apparatus type indicates a type of a cooperation apparatus of one of the plurality of disposition destinations for each UI component of the plurality of UI components;
calculating, by the CPU, a score of each disposition candidate pattern of the plurality of disposition candidate patterns;
determining, by the CPU, disposition information from the plurality of disposition candidate patterns based on the calculated score,
wherein the determined disposition information indicates a combination of the plurality of cooperation apparatuses of the plurality of disposition destinations of the plurality of UI components, the combination satisfies the duplication policy, and the disposition information satisfies a condition related to the apparatus type and the duplication policy; and
controlling, by the CPU, the disposition of the UI based on the disposition information.

16. A non-transitory computer-readable medium having stored thereon, computer-executable instructions, which when executed by a processor, cause the processor to execute operations, the operations comprising:
determining a value corresponding to at least one pair of a cooperation apparatus and a user interface (UI) component among a plurality of cooperation apparatuses and a plurality of UI components of a UI, based on detection of a user presence in proximity to the cooperation apparatus of the at least one pair of the cooperation apparatus and the UI component;
controlling disposition of the UI in the plurality of cooperation apparatuses,
wherein the plurality of cooperation apparatuses is configured to execute a cooperation operation among the plurality of cooperation apparatuses; and
controlling the disposition of the UI based on a positional relation between a plurality of users and the plurality of cooperation apparatuses and a duplication policy,
wherein
the duplication policy indicates whether UI duplication disposition in the plurality of cooperation apparatuses is permitted for each UI component of the plurality of UI components, and
based on establishment of the positional relation, controlling the disposition of the UI further comprises:
generating a plurality of disposition candidate patterns belonging to an apparatus type, wherein
each disposition candidate pattern of the plurality of disposition candidate patterns includes a pair group of the plurality of cooperation apparatuses of a plurality of disposition destinations of the plurality of UI components and the UI components in which the duplication policy is satisfied, and
the apparatus type indicates a type of a cooperation apparatus of one of the plurality of disposition destinations for each UI component of the plurality of UI components;
calculating a score of each disposition candidate pattern of the plurality of disposition candidate patterns;
determining disposition information from the plurality of disposition candidate patterns based on the calculated score,
wherein the determined disposition information indicates a combination of the plurality of cooperation apparatuses of the plurality of disposition destinations of the plurality of UI components, the combination satisfies the duplication policy, and the disposition information satisfies a condition related to the apparatus type and the duplication policy; and
controlling the disposition of the UI based on the disposition information.

\* \* \* \* \*